United States Patent
White et al.

(10) Patent No.: US 8,966,109 B2
(45) Date of Patent: *Feb. 24, 2015

(54) SYSTEMS, METHODS AND COMPUTER-READABLE MEDIA FOR CONFIGURING RECEIVER LATENCY

(75) Inventors: Andrew White, Ingleburn (AU); Aidan Williams, Chifley (AU)

(73) Assignee: Audinate Pty Limited, Ultimo, New South Wales (AU)

( * ) Notice: Subject to any disclaimer, the term of this patent is extended or adjusted under 35 U.S.C. 154(b) by 371 days.

This patent is subject to a terminal disclaimer.

(21) Appl. No.: 13/426,179

(22) Filed: Mar. 21, 2012

(65) Prior Publication Data

US 2012/0195313 A1     Aug. 2, 2012

Related U.S. Application Data

(63) Continuation of application No. 12/451,420, filed as application No. PCT/AU2008/000656 on May 12, 2008, now Pat. No. 8,171,152.

(30) Foreign Application Priority Data

May 11, 2007   (AU) .............................. 2007902513
May 15, 2007   (AU) .............................. 2007902582

(51) Int. Cl.
    G06F 15/16        (2006.01)
(52) U.S. Cl.
    USPC ........... 709/232; 709/203; 709/219; 709/223; 709/224

(58) Field of Classification Search
    CPC .............. H04L 43/087; H04L 29/0854; H04L 67/1095; H04L 43/0864
    USPC .......................... 709/203, 219, 223, 224, 232
    See application file for complete search history.

(56) References Cited

U.S. PATENT DOCUMENTS

| | | | |
|---|---|---|---|
| 5,682,384 | A | 10/1997 | Zarros |
| 6,175,604 | B1 | 1/2001 | Noro et al. |
| 6,360,271 | B1 | 3/2002 | Schuster et al. |
| 6,553,040 | B2 | 4/2003 | Bernath et al. |

(Continued)

FOREIGN PATENT DOCUMENTS

| EP | 1148687 | 10/2001 |
|---|---|---|
| EP | 1398931 | 3/2006 |

(Continued)

OTHER PUBLICATIONS

International Search Report dated Jul. 29, 2008 for PCT/AU2008/000656.

(Continued)

*Primary Examiner* — Phuoc Nguyen
(74) *Attorney, Agent, or Firm* — Jones Day

(57) ABSTRACT

The present disclosure is related to transmitting and receiving media channels, such as audio and video channels. These channels may be transmitted as packets from one or more transmitting devices to one or more receiving devices for playout. Certain embodiments of the present disclosure include systems, methods, and computer-readable media for determining latency of a data network for synchronized playout of received signals. Additionally, certain embodiments of the present disclosure include a systems, methods, and computer-readable media for synchronizing playout among devices connected to a data network.

20 Claims, 12 Drawing Sheets

(56) References Cited

U.S. PATENT DOCUMENTS

| | | |
|---|---|---|
| 6,611,537 B1 | 8/2003 | Edens et al. |
| 6,661,804 B2 | 12/2003 | Fellman et al. |
| 6,665,308 B1 | 12/2003 | Rakib et al. |
| 6,675,314 B1 | 1/2004 | Yamada et al. |
| 6,763,479 B1 | 7/2004 | Hebert |
| 6,857,080 B1 | 2/2005 | Liang |
| 7,000,031 B2 | 2/2006 | Fischer et al. |
| 7,096,271 B1 | 8/2006 | Omoigui et al. |
| 7,206,367 B1 | 4/2007 | Moore |
| 7,342,890 B1 | 3/2008 | Ferguson |
| 7,551,647 B2 | 6/2009 | Fellman et al. |
| 7,747,725 B2 | 6/2010 | Williams et al. |
| 2001/0038674 A1 | 11/2001 | Trans |
| 2002/0136198 A1 | 9/2002 | Findikli |
| 2002/0150053 A1 | 10/2002 | Gray, III et al. |
| 2003/0093703 A1 | 5/2003 | Oliver et al. |
| 2003/0156603 A1 | 8/2003 | Rakib et al. |
| 2003/0223409 A1 | 12/2003 | Wiebe |
| 2003/0235216 A1 | 12/2003 | Gustin |
| 2003/0236904 A1 | 12/2003 | Walpole et al. |
| 2004/0001435 A1 | 1/2004 | Wong |
| 2004/0052209 A1 | 3/2004 | Ortiz |
| 2004/0062278 A1 | 4/2004 | Hadzic et al. |
| 2004/0100942 A1 | 5/2004 | Blank et al. |
| 2004/0228367 A1 | 11/2004 | Mosig |
| 2004/0234000 A1 | 11/2004 | Page |
| 2004/0252400 A1 | 12/2004 | Blank et al. |
| 2005/0036512 A1 | 2/2005 | Loukianov |
| 2005/0039065 A1 | 2/2005 | Cheung et al. |
| 2005/0138459 A1 | 6/2005 | Yoon et al. |
| 2005/0166135 A1 | 7/2005 | Burke et al. |
| 2005/0201399 A1 | 9/2005 | Woodward, Jr. et al. |
| 2005/0288805 A1 | 12/2005 | Moore et al. |
| 2006/0005099 A1 | 1/2006 | Strasman et al. |
| 2006/0013262 A1 | 1/2006 | Downey et al. |
| 2006/0013263 A1 | 1/2006 | Fellman |
| 2006/0056432 A1 | 3/2006 | Azarov |
| 2006/0072578 A1 | 4/2006 | Alfano |
| 2006/0135258 A1 | 6/2006 | Maheshwari et al. |
| 2006/0161835 A1 | 7/2006 | Panabaker et al. |
| 2006/0280182 A1 | 12/2006 | Williams et al. |
| 2007/0002886 A1 | 1/2007 | Lanigan et al. |
| 2007/0076727 A1 | 4/2007 | Shei |
| 2007/0081562 A1 | 4/2007 | Ma |
| 2007/0280125 A1 | 12/2007 | Sonnier |
| 2008/0002669 A1* | 1/2008 | O'Brien et al. ............... 370/352 |
| 2008/0187282 A1 | 8/2008 | Brady et al. |
| 2008/0273527 A1* | 11/2008 | Short et al. ................... 370/364 |
| 2009/0274149 A1 | 11/2009 | Williams et al. |
| 2010/0046383 A1 | 2/2010 | Williams et al. |
| 2010/0183021 A1* | 7/2010 | Cloonan et al. ............... 370/412 |
| 2010/0228881 A1 | 9/2010 | Williams et al. |
| 2010/0235486 A1 | 9/2010 | White et al. |
| 2011/0002429 A1 | 1/2011 | Williams et al. |

FOREIGN PATENT DOCUMENTS

| | | |
|---|---|---|
| WO | WO/0072509 | 11/2000 |
| WO | WO/2004008738 | 1/2004 |
| WO | WO/2005006621 | 1/2005 |
| WO | WO/2006057992 | 6/2006 |
| WO | WO/2007131296 | 11/2007 |
| WO | WO/2007131297 | 11/2007 |
| WO | WO/2008138047 | 11/2008 |
| WO | WO/2009105838 | 9/2009 |

OTHER PUBLICATIONS

Blank et al. "An Internet Protocol (IP) Sound System," AES (Audio Engineering Society) 117th Convention San Francisco, CA (Oct. 2004).

David V. James; "Transmit State Machines"; IEEE 802.3 Residential Ethernet Study Group presentation, Sep. 21, 2005; pp. 107-121.

Felix F. Feng; "On the worst case, and pacing"; IEEE 802.3 Residential Ethernet Study Group presentation; Sep. 30, 2005; slides 1-17.

John Nels Fuller: "Calculating the Delay Added by Qav Stream Queue": IEEE 802.1Qav presentation; Aug. 12, 2009; pp. 1-4.

Geoffrey M. Garner; "Delay and Delay Variation Simulation Results for Additional Multi-hop Conventional Ethernet Cases with Bursting/Bunching"; IEEE 802,3 Residential Ethernet Study Group presentation; Sep. 14, 2005; slides 1-24.

Geoffrey M. Garner; "Delay and Delay Variation Simulation Results for Multi-hop Conventional Ethernet Cases with Bursting/Bunching"; IEEE 802.3 Residential Ethernet Study Group presentation; Aug. 19, 2005; slides 1-33.

Max Azarov; "On worst-case Latency for Ethernet networks and alternative shaping concept"; IEEE 802.3 Residential Ethernet Study Group Forum available at http://grouper.ieee.org/groups/802/3/re__/study/email/msgO0680.html; Sep. 26, 2005.

Max Azarov; "Worst-case Ethernet Network Latency for Shaped Sources": IEEE 802.3 Residential Ethernet Study Group presentation; Oct. 7, 2005: pp. 1-12.

Max Azarov: "Worst-case Ethernet Network Latency"; IEEE 802.3 Residential Ethernet Study Group presentation; Sep. 26, 2005; pp. 1-4.

Yamaha Systems Solutions white paper, Networked audio system design with CobraNet, 16 pages, 2006.

* cited by examiner

SYSTEMS, METHODS AND COMPUTER-READABLE MEDIA FOR CONFIGURING RECEIVER LATENCY

PRIORITY DOCUMENTS

The present application is a continuation of U.S. patent application Ser. No. 12/451,420, filed 26 Mar. 2010, which is a National Phase application of International Application No. PCT/AU2008/000656, filed 12 May 2008, which claims priority from Australian Provisional Patent Application No. 2007902513 entitled "Configuring Receiver Latency" and filed 11 May 2007; and Australian Provisional Patent Application No. 2007902582 entitled "Configuring Receiver Latency" and filed 15 May 2007. The entire content of each of these applications is hereby incorporated by reference.

CROSS REFERENCE TO RELATED APPLICATIONS

The present application is related to the following co-pending applications:
"Method for Transporting Digital Media," U.S. patent application Ser. No. 11/409,190 filed Apr. 21, 2006;
"Transmitting and Receiving Media Packet Streams," PCT Application No. PCT/AU2007/000668 filed May 17, 2007; and
"Redundant Media Packet Streams," PCT Application No. PCT/AU2007/000667 filed May 17, 2007. Each of these applications is herein incorporated by reference, in its entirety.

TECHNICAL FIELD

The present disclosure is related to transmitting and receiving media channels, such as audio and video channels. These channels may be transmitted as packets from one or more transmitting devices to one or more receiving devices for playout. Certain embodiments of the present disclosure include systems, methods, and computer-readable media for determining latency of a data network for synchronised playout of received signals. Additionally, certain embodiments of the present disclosure include systems, methods, and computer-readable media for synchronising playout among devices connected to a data network.

BACKGROUND

Many conventional media systems are connected with analogue cabling. Usually, the wiring radiates out from a small number of centralised pieces of equipment. Propagation delay along the cables is so small as to be negligible. In these implementations, compensation for input and output latency can be carried out manually because there are only a few centralised pieces of equipment.

However, several factors can cause play out between different pieces of equipment to be out of sync. For example, different receivers (amplifiers and/or speakers) can take different amounts of time to play the signal out, and the presence or absence of intermediate processing devices will cause differing delays.

A simple analogue audio system (short cable runs, identical speakers) usually uses a fully synchronous master-slave system. An example would be, amplifier and speakers wherein the amplifier puts a signal on wire and speakers slave to this signal and play it out without worrying about timing. This typically works adequately if speakers take roughly the same amount of time to process the audio, which is normal if they are the same sort of speaker. In most situations, the time on wire is so small as to have no effect. But in a big system, with multiple amps and speakers in diffuse locations, the delays might not be negligible. Additionally, a mixed-media situation (audio+video) typically will not have identical playout devices.

However, large-scale analogue systems are being replaced by distributed, networked systems because of the benefits of networking for the distribution of signals and the wholesale digitalisation of media equipment. Digital typically improves on analogue audio issues, but may create new problems with regards to timing.

Digital audio systems may have timing issues even for a single transmitter and receiver. The transmission path in a digital system typically involves buffers and digital samples, which means that data must be clocked into and out of buffers. The clock rate typically needs to be synchronised with digital (sample) audio. If the rate is not synchronised, the receiver will consume samples either faster than the transmitter sends them (and run out of samples) or slower than the transmitter sends them (and over-fill its buffer). Thus the transmitter and all the receivers must run (on average) at exactly the same rate to avoid the creation of audio artefacts.

Differences in clocks can be described in terms of rate and offset. Rate applies to all clocks and refers to how fast the clock runs. If two clocks run at different rates, then buffer overrun and underrun will occur. Offset applies only to clocks that maintain a time value, and measures the difference between the current value of each clock. Simple digital timing mechanisms synchronise rate only. A mechanism is used to allow either the transmitter or a particular device on the network to dictate and discipline the clock rate for every device on the network.

Some architectures (for example "AES") use very small buffers, in the range of 1-4 samples. An AES transmitter sends multiplexed digital audio down a dedicated line. Receivers in these architectures slave directly to the transmitter and read data per-sample. Rate is typically managed by the arrival of samples while offset is typically ignored.

In contrast, packet-based architectures may be used. These architectures typically need much bigger buffers, as the buffer must contain a full "packet" worth of samples plus enough space to allow for however long the packet medium takes to transmit a packet. One common way to achieve this is for the system to define a fixed delay across the entire system and then use a clocking mechanism in the transmission protocol to achieve timing consistency.

For example, a technology might use clocking information in packets for rate control and timing, and define that all nodes must allow 3 ms latency before playout. This typically works adequately in systems where all components have near-identical specifications and then network is tightly controlled (e.g. all I/O is done via a single manufacturer's hardware boards), but may be problematic in systems with significantly different components.

Some such systems (e.g. "CobraNet") are rate-controlled only, using regular conductor packets to control timing and discipline clocks. One drawback of conductor packets is that every network hop adds delay and thus clocks are not synchronised with regard to offset. Variation in output times in such a system can be in the hundreds of microseconds or more.

Typically, less sophisticated packet-based architectures do not attempt to enforce ongoing synchronisation. Clocks are roughly synchronised by the initial transmission and then free-run. Buffering issues and synchronisation are dealt with by regularly resynchronising the audio, such as after each song. This works satisfactorily for a low-precision system with frequent breaks (e.g., streaming home audio), but not for professional audio. Clocks on personal computers (for example) can easily drift 50 ms over the course of 5-10 minutes, which is more than enough to provide noticeable audio artefacts. For example, an error of 50-100 parts per million (PPM) from "nominal" (30-60 ms over 10 minutes) is not unusual for an undisciplined oscillator crystal. Disciplined crystals that are allowed to run freely can maintain 1-2 PPM with respect to each other, but that requires a synchronisation mechanism to discipline them in the first place.

A master-slave system may also experience difficulties when there is more than one transmitter. Different transmitters may have different clock rates compared to each other. To handle this, clocks could be synchronised from a single source; for example, a master on the transmission network or an external word clock. Alternatively, the receivers may operate a different clocking and buffering domain for each input, and then post processes to adjust the inputs to the receiver's internal clock rate (which might be slaved to an input). A consequence of this latter strategy is that receivers post-processing to different clocking domains may not be properly synchronised, nor can transmissions from different clocking domains.

Conventional digital audio networking may involve distributed, digital media systems being built using heterogeneous, off-the-shelf networking equipment and cabling, although end-nodes are usually proprietary equipment. The result is distributed media systems containing many boxes for passing media signals over the network.

Existing digital media networking technologies typically have a number of problems including, for example, but not limited to:

Fixed packet sizes and sample rates for the whole network
Fixed or limited topologies, e.g., fixed upper limits on latency
Transmission delay sufficiently large that it can no longer be ignored
Packetisation delay (the time taken to collect samples and put them into packet), which is inherent in TCP/IP or Ethernet based audio networks, that is sufficiently large that it cannot be ignored In addition, existing audio networking technologies typically:

Do not account for latency introduced hop by hop in the network
Treat all senders and receivers as having the same characteristics (e.g. input latency, packetisation delay, variability in transmission timing)
Runs at the latency of the slowest node in the network since all senders and receivers have the same latency
Typically manage latency manually (i.e., computed with a pen and a piece of paper given a network topology), or set the latency at the worst-case maximum value for the entire network.

These types of limitations have restricted the utility of existing media networking technologies.

SUMMARY

Certain embodiments according to the present disclosure address some of these problems and limitations.

Certain embodiments of the present disclosure in use are able to minimise latency in the media network.

Certain embodiments of the present disclosure in use are able to synchronise sets of signals (e.g. stereo left/right, multiple speakers and video screens at a concert or conference).

Certain embodiments of the present disclosure in use are able to set latencies to ensure reliable reception.

Certain embodiments of the present disclosure in use are able to make setup of latency as easy as possible, and in some respects automatic, for a user.

Certain embodiments of the present disclosure in use are able to achieve sample-accurate timing, which means that timing is accurate within one sample period (for example, +/−10 us for 96 kHz audio samples).

Certain embodiments of the present disclosure in use are able to take a set of outputs on one or more receivers whose signals might have been sent from multiple transmitters, and them play them out at the substantially the same time.

Certain embodiments of the present disclosure in use are able to configure different sets of outputs to have different latencies (or even "don't care" values), depending on the signal and play out device (e.g., receiver).

In certain embodiments, the present disclosure concerns systems, methods, and computer-readable media for synchronising the play out of a media channel received by multiple receiver devices.

In certain embodiments, the present disclosure concerns systems, methods, and computer-readable media for synchronising play out of a media channel among a plurality of receiving devices in communication with a network, characterized by the steps of: providing a shared concept of time to a plurality of receiving devices in communication with a network; obtaining a minimum latency value and a maximum latency value for each of the plurality of receiving devices; communicating the minimum latency value and the maximum latency value for each of the plurality of receiving devices; choosing a current latency value based on the minimum latency value and the maximum latency value for each of the plurality of receiving devices; and playing out the media channel from the plurality of receiving devices according to the current latency value.

In certain embodiments, the present disclosure concerns systems, methods, and computer readable-media that synchronise the play out of at least one channel received by at least one receiver device characterized by the steps of:

at least one receiver determining a minimum latency for at least one channel;
the at least one receiver receiving a minimum latency of at least one other receiver; and
the at least one receiver using the larger of the determined minimum latency or received minimum latency for determining the play out time of the media channel.

In certain embodiments, the present disclosure concerns systems, methods, and computer-readable media for substantially synchronising the play out of at least one channel received by at least one receiver device, the method comprising the steps of:

at least one receiver determining a first latency value for at least one channel;
the at least one receiver receiving a second latency of at least one other receiver; and
the at least one receiver using the larger of the first latency or the second latency for determining the play out time of the media channel.

In certain embodiments, the present disclosure concerns systems, methods, and computer readable media for synchro nising the play out of at least one channel received by at least one receiver device characterized by:
- means for at least one receiver determining a minimum latency for at least one channel;
- means for the at least one receiver receiving a minimum latency of at least one other receiver; and
- means for the at least one receiver using the larger of the determined minimum latency or received minimum latency for determining the play out time of the media channel.

This may allow receivers of a media network to adaptively set play out time based on their own properties and negotiate the time latency value amongst themselves. In some aspects, this removes, or substantially removes, reliance for negotiating time latency values from the transmitting devices since the transmitter may not be required to make direct decisions about play-out time. Instead the receivers who have easier access to information about transmission and play-out delays) make these decisions.

The determined (and received) minimum latency may be an end-to-end latency value for the media channel. The end-to-end latency value may include:
- a digital domain latency value; and
- latency values from outside the digital domain.

The digital domain latency value may include:
- a receiver latency value;
- a transmitter latency value; and
- a transmission latency value.

The latency values from outside the digital domain may include a transmitter latency value, such as the time it takes from producing a sample to timestamping the sample. The transmitter latency values may be received from the transmitter.

In certain embodiments, the systems, methods, and computer readable media disclosed may further comprise the step of determining maximum latency values. The maximum latency values may include, but is not limited to:
- latency values from outside the digital domain; and
- the maximum buffer latency.

If the latency to be used to determine the play out time of the media channel is larger than the determined maximum latency of the receiver, the receiver may perform some action, such as, for example, send an error message.

In certain embodiments, the receiver may receive the minimum latency value of the other receiver as a multicast message from the other receiver or from a central database.

In certain embodiments, the systems, methods, and computer-readable media may further comprise the step of sending the larger of the determined minimum latency value or the received minimum latency value of the other receiver. Again, this may be as a multicast message or to a central database.

The systems, methods, and computer-readable media disclosed may be performed by, or operate with, each receiver that is to receive the same media channel. These receivers may be considered a group. If any receiver of the group is to receive a further media channel to be played out in synchronisation with the media channel, the determined minimum latency for that receiver may be the largest minimum latency for all media channels that the receiver will receive.

The systems, methods, and computer-readable media may be performed, or operate, prior to receiving the media channel and in order to update the latency value used by the receiver as receivers enter and depart the group or media signals received change.

Determining the play out time of the media channel may comprise determining a latency offset for a buffer of the receiver.

The systems, methods, and computer-readable media may further comprise estimating the digital domain latency value based on timestamps included in the media signal. The determined minimum latency may be amended based on the estimated digital domain latency value.

Certain embodiments also concern computer software programs that may be used to operate a receiver according to the methods disclosed herein.

Certain embodiments also concern at least one receiver device to perform the methods disclosed herein.

Certain embodiments also concern at least one transmitter device to communicate to at least one transmitter device the latency of the receiving device.

Certain embodiments also concern at least one data network comprised of at least one receiver device and at least one transmitter device.

DETAILED DESCRIPTION OF EXEMPLARY EMBODIMENTS

Figure 1A:
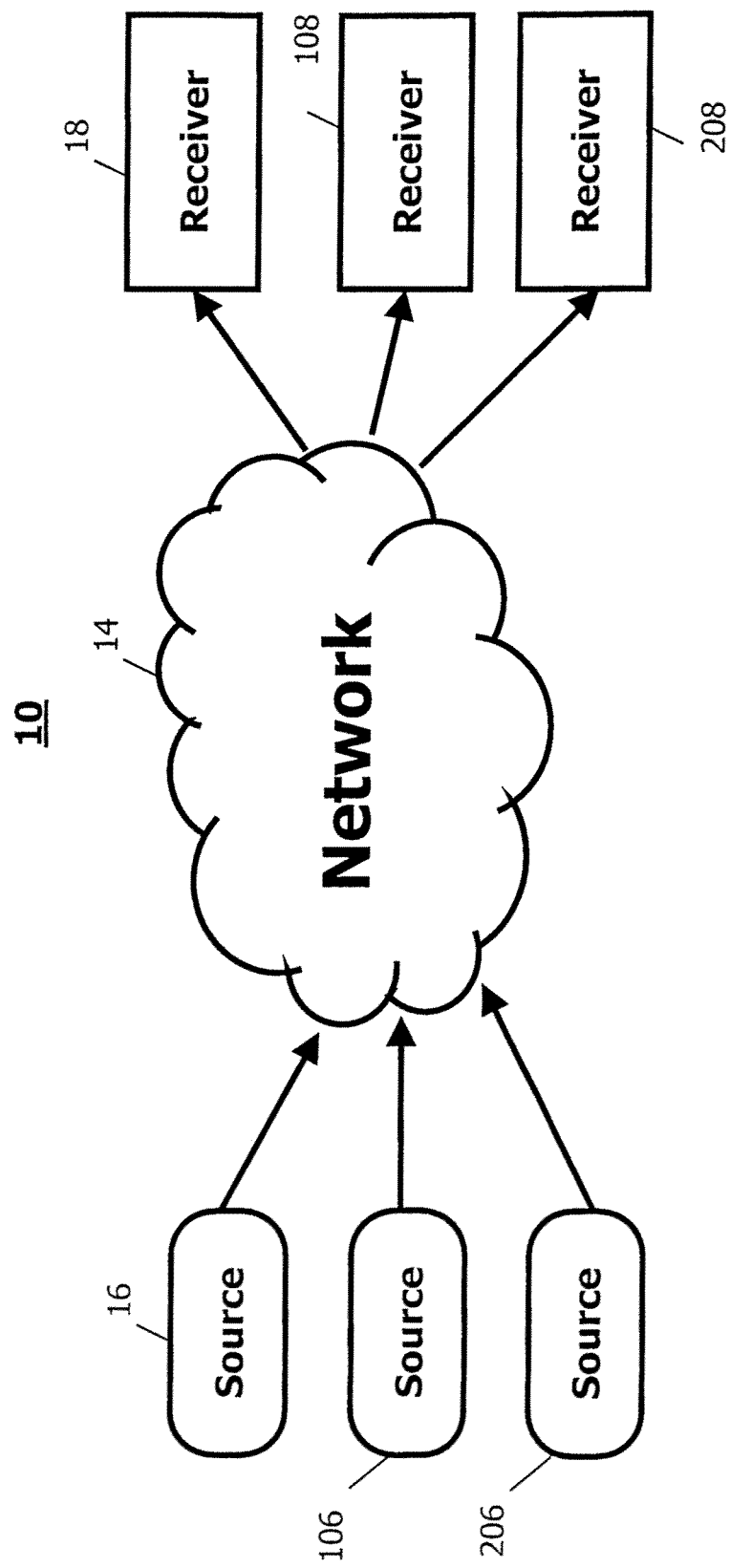
FIGS. 1a and 1b illustrate exemplary data networks having receiver devices and transmitter devices in accordance with certain embodiments.

While the inventions described herein are described with reference to certain exemplary embodiments related to transmitting and receiving media channels, it will readily be appreciated by persons of ordinary skill in the art, in view of this disclosure, that the inventions disclosed herein are not limited to such embodiments.

Throughout the specification like reference numerals will be used to refer to the same features in the drawings.

Certain embodiments of the present disclosure may efficiently handle media channels in systems with multiple transmitters and receivers that include heterogeneous (non-identical) and/or homogeneous (substantially identical) devices. An independent clocking protocol may be used to discipline both rate and value of local clocks on every node, giving each device a common notion of time (to within a few microseconds, or even more accurate).

Certain embodiments of the present disclosure remove the restrictions of existing media networking technologies, supporting flexible and efficient networking over off-the-shelf networks. This flexibility may enable many features that could be difficult for the end user of the networking system to manage or configure. Because different types of audio devices typically have differing performance characteristics and if a network with more than a couple of devices were to be manually configured, there would be too many knobs and dials for the user to cope with. Automatic techniques as described in the present disclosure may be desirable to reduce the burden on the user and also to increase the reliable operation of the equipment (e.g., mis-configuration of receiver latency could result in audio glitches).

A problem that certain embodiments of the present disclosure address is that in networked media systems, to achieve acceptable synchronisation, each potential transmitter to receiver pairing introduces a new variable that must be accounted for and configured. Some conventional systems work around this by setting fixed parameters (e.g., latency through the system will be set at 3 ms), but this may limit the ability to mix and match different types of devices. This means that better devices won't be able to run faster, and slower devices won't run at all. Devices with highly accurate clocking and fast transmission paths (e.g., one switch hop and gigabit Ethernet) may be able to reliably move data through the digital portion of the system in less than 1 ms. Future improvements in Ethernet, chip hardware and clocking technology may lower this further. In many deployment situations it is desirable to exploit this low latency. Other systems, such as software based systems, suffer from inaccurate timing that may infrequently delay clocks by as much as 5-10 ms. Such a device in a system with a 3 ms timeout will occasionally result in lost data.

What is acceptable synchronisation depends on the specific application and a number of other factors. For example, it is complicated by acoustic effects—e.g., the distance between left and right loudspeakers changes when you move your head. Moreover, there is the so-called Haas Effect. The Haas Effect, also known as the precedence effect, describes the human psycho-acoustic phenomenon of correctly identifying the direction of a sound source heard in both ears but arriving at different times. Due to the head's geometry the direct sound from any source first enters the ear closest to the source, then the ear farthest away. The Haas Effect tells us that humans localize a sound source based upon the first arriving sound, if the subsequent arrivals are within 25-35 milliseconds. If the later arrivals are longer than this, then two distinct sounds are heard.

The Haas effect can produce an apparent increase in the volume from one of a pair of stereo speakers. In a high quality Hi-Fi system, this effect can be perceived at time differences of only 1-2 msec between the two stereo channels, becoming increasingly noticeable up to 25 msec or so. Greater time lags will be perceived as echoes and reverberations. Accordingly, to avoid the Haas Effect, synchronisation between networked multi-channel speakers may be desirable.

If samples are not played out via a speaker but instead travel different paths into a mixing device such as an audio mixer, then 1 ms is much too inaccurate. Even a difference of a single sample may lead to interference between identical input signals, becoming more noticeable as the inputs drift more out of phase.

For digital systems, acceptable synchronisation may be described in terms of "sample accurate synchronisation." When two signals are combined digitally, they may be aligned to the sample. If they are not aligned to the sample, frequency distorting effects like comb filtering can affect the quality of the sound produced. Sample accurate timing is dependent on the sample rate. For example, at 48 kHz, a sample period is ~21 µs. To unambiguously align samples in time, typical implementations will use about 20% of the sample period as the synchronisation target. For a sample rate of 192 kHz, that translates to ±1 µs phase synchronisation accuracy.

Embodiments of the present disclosure may include one or a combination of the following features, which are each described in detail below:

(1) a shared concept of "time" across devices (e.g., distinct internal clocks synchronised via Precision Time Protocol (PTP) as defined in IEEE 1588-2002 standard);

(2) a mechanism to obtain latency values for channels on receiving and play-out devices;
   (a) a mechanism to account for latency due to transmission;
   (b) a mechanism to account for latency in processing within the receiving device;

(3) a mechanism to define "groups" of devices that will share a common latency on play-out; and (4) a mechanism to share latency information between members a group and choose a value that meets all constraints (or determine that the constraints cannot be met and usefully recover from this condition).

Referring to FIG. 1a, an exemplary network 10 for transmitting media signals is shown. Suitable networks can include any data transmission architecture that can transmit media. For example, a network could include one or a combination of wired and/or wireless Ethernet-based networks (e.g., 802.11, conventional Ethernet), Firewire or a similar media bus, a fibre distributed data interface (FDDI)/fibre optic network, and/or point-to-point style audio transmission networks (e.g., AES). Source signals are transmitted onto the network by three transmitting devices 16, 106, 206. Typical audio sources can include, for example, one or a combination of microphones, instruments, turntables, CD/tape/sound FX decks, and computers. Three receiving devices 18, 108, 208 receive these signals for processing and playback. Typical audio receiving devices can include, for example, speakers, amplifiers, and recording devices. While three transmitting devices and three receiving devices are shown for exemplary purposes, any combination of any number of transmitting and receiving devices could be used. Additionally, one or more of the devices may be both an audio source and an audio receiving device. Examples of such devices can include mixing consoles (and computers performing this role), FX and other processing units, and interfaces to other transmission media. Analogous devices exist for video or other signal media such as, for example, video cameras and television monitors.

The illustrated media signals are typically in some form of digital or discrete format. For audio and video, this may be periodic samples. Other media may transmit non-periodic data (e.g., MIDI).

Time synchronisation between sources 16, 106, 206 and receivers 18, 108, 208 may be important in certain implementations. Poor time synchronisation can result in buffering errors and unsynchronised play-out. Thus, a tight timing relationship among receivers 18, 108, 208, and between senders 16, 106, 206 and receivers 18, 108, 208 may be desirable in some implementations.

Buffering and/or rate control may also be advantageous. Receivers 18, 108, 208 usually place sampled digital media data into a buffer ready for processing. If samples from the network are placed into a buffer at a faster rate than they are removed, the buffer may become over-full and data will be lost. If samples are received at a slower rate than they are removed, the buffer will eventually become empty and play-out may glitch.

Thus, a transmitter 16 and receiver 18 often could be rate-controlled with respect to each other, with the receiver pulling samples out at the same rate that the transmitter is putting them in. The buffer allows for some leeway, but typically this must be (relatively) small and the average rate typically will match.

Alternatively, a mechanism (such as an asynchronous sample rate converter) could be used to reprocess the received samples to match the receiver's actual sample rate. However, this could be time consuming and computationally expensive and also might degrade sample quality.

Using multiple receivers 18, 108, 208 for play-out of a single signal adds an additional level of complication. Not only is it desirable for each receiver to be rate controlled according to the source, but each receiver playing the same media should do so at the "same" time. For audio, differences of even a few milliseconds can be detected by some hearers; differences of tens or hundreds of milliseconds may become quite noticeable.

Play-out synchronisation is also important for multiple signals. For example, if audio signals are being sent to a "left" and a "right" speaker, they need to play back at the same time or noticeable artefacts will occur.

Some media transmission mechanisms do not require rate control, usually because they are not built on a sampled architecture. Analogue audio or MIDI commands are examples of this. However, such systems may still benefit from play-out synchronisation.

Figure 1B:
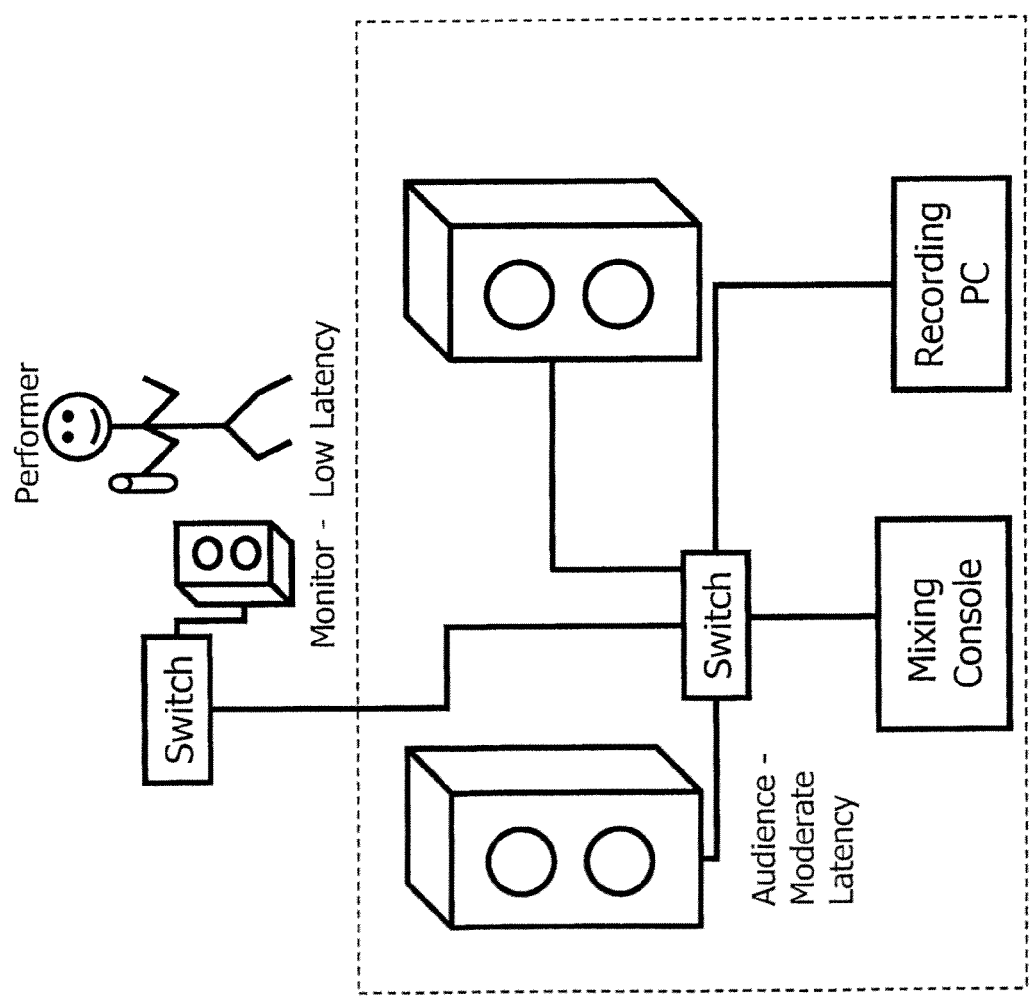

An exemplary system demonstrating multiple media sources and receivers is demonstrated in FIG. 1b. As shown, a single network for a concert may have a foldback or in-ear monitoring system for the performer which requires very low latency, a front-of-house system for the audience requiring moderately low latency, a mixing console, and a node (e.g., a computer) recording the show which typically operates at a high latency.

Figure 2:
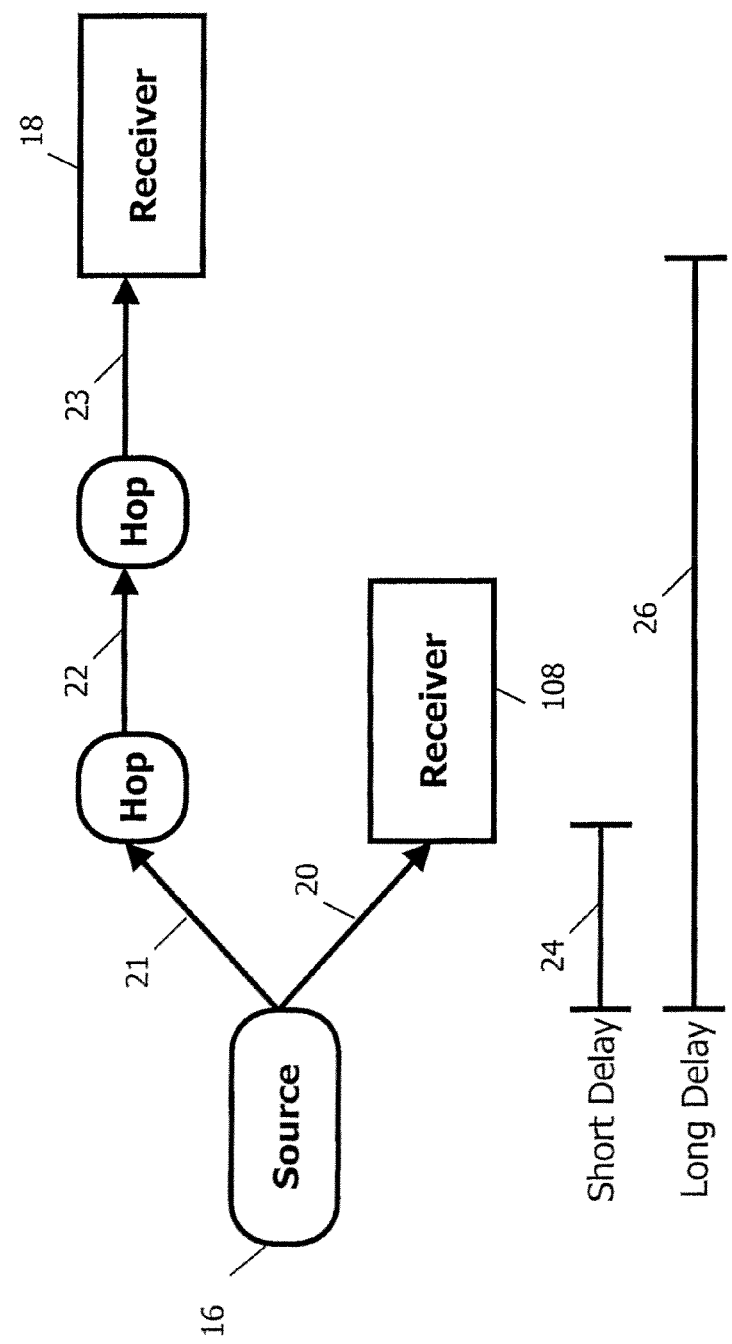
FIG. 2 is a schematic diagram of two signals having a different amount of hops during transmission on a data network in accordance with certain embodiments.

Referring to an exemplary system shown in FIG. 2, one signal path 20 travels a single hop from source 16 to play-out at receiver 108, while the other signal path 21, 22, 23 must traverse three hops to reach receiver 18. Assuming that each hop adds a non-negligible amount of delay, the signal 20 travelling the single hop could will incur a short delay 24 and play out significantly sooner than the signal travelling multiple hops 21, 22, 23 which will incur a longer delay. In certain embodiments, compensating for this difference in delays 24 and 26 may be done by a mechanism to delay the faster signal 20 (generally at the receiver 108) so that both play out at the same time.

Certain embodiments provide a shared concept of time across some or all of the devices in a network. Sharing a concept of time (and not just rate), advantageously avoids some latency synchronisation issues. If the receivers in a network share the same time and have sufficient buffers (described below), then certain embodiments allow the receivers to buffer each sample until a particular time and then play it. Advantageously, this can negate some latency synchronisation issues due to packetisation and transit. However, it should be noted that this latency may still matter in terms of total system latency, such as for a live concert, but not for play-out synchronisation. Thus the remaining latency differences that might be accounted for are the individual devices' internal processing latencies.

In certain embodiments, when dealing with a single source and sampled digital data, a rate control mechanism is to slave the receiver's clock rate to the communications link. The receiver matches clock rate to the mean rate of the incoming samples, and thus maintains a rate controlled clock as long as the transmitter is correctly transmitting.

This same mechanism may work in a cascade, with each receiver matching rate with the transmitter up the chain. However, it fails when a single receiver must be rate controlled to more than one transmitter (e.g. an audio mixing console), unless those transmitters are also rate controlled with each other. This mechanism does not provide play-out synchronisation, except through manual addition of artificial delays in receivers.

In some aspects, an alternative mechanism may be used that removes the cascade and introduces a global clock that governs activity for transmitters and receivers in the network. All, or substantially all, activity on the network is slaved to the pulses of this clock.

This can remove delays caused by cascading hops and provides synchronisation and rate control for all, or substantially all, receivers. However, there are scalability issues. Because signals are still timed by the arrival of periodic arrival of a clock sync pulse/packet, the network is limited to a size, speed and bandwidth that can pass data aligned with the clock pulses.

In some systems using global clocking (e.g., Cobranet), clock pulses are delayed hop-by-hop as they pass through network switches. In such a case, the path length can differ from one receiver to another, and play-out synchronisation becomes an issue.

More robust systems share a clock that is both rate and offset controlled. This allows samples to be played out at a particular time referenced from a common time-base. This sort of system is much less affected by variations in transmission time, since all samples may be resynchronised before playout.

Figure 3A:
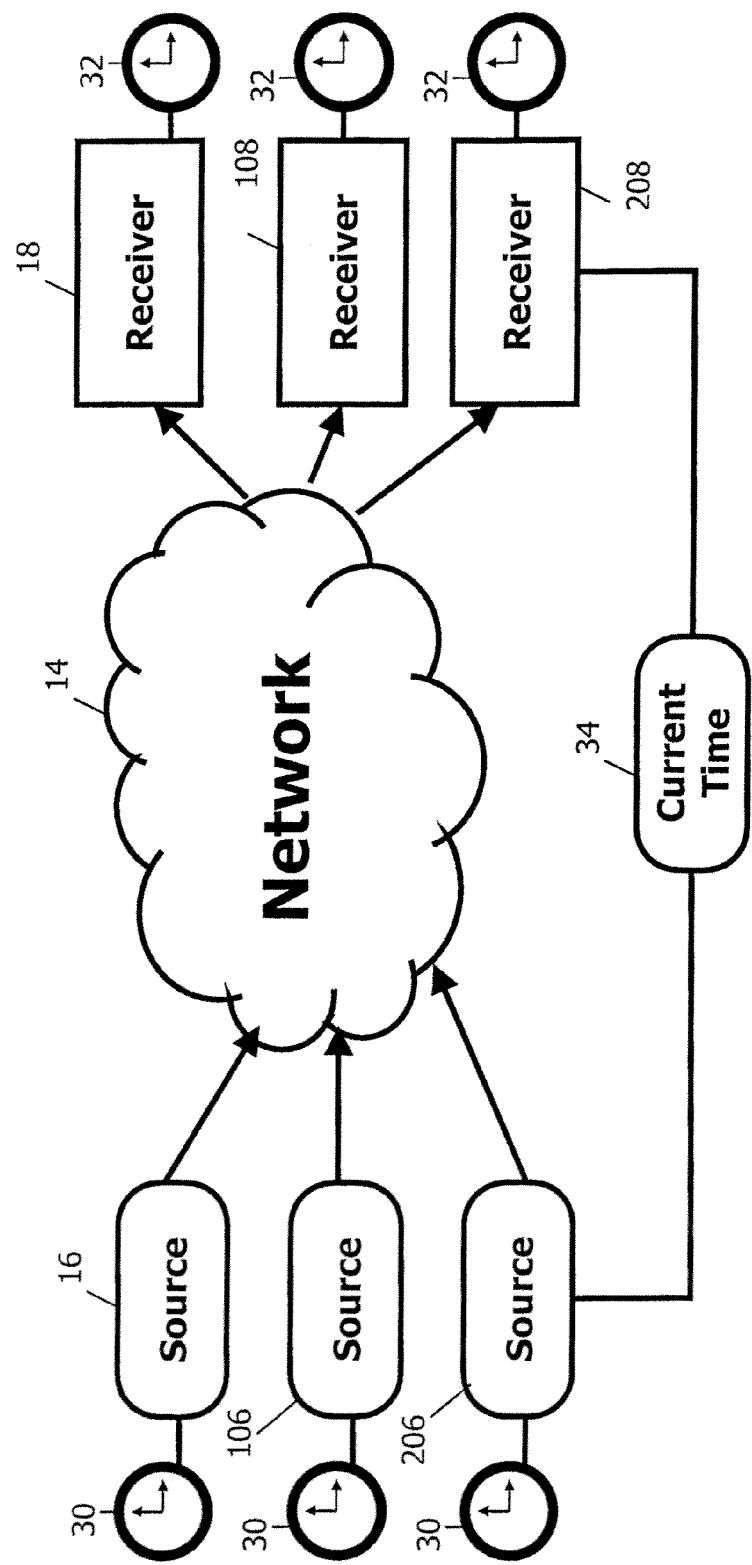
FIGS. 3a to 3d illustrate exemplary data networks having multiple receiver devices, multiple transmitter devices and a common concept of time in accordance with certain embodiments.

In certain embodiments a preferred solution may be to decouple clocking and data transfer. Referring to FIG. 3a, each device 16 and 18 runs its own independent clock 30 and 32, and a mechanism is used to discipline all these clocks so that they share the "same" time 34 (to some level of accuracy). The discipline algorithm does not clock the network; rather, it ensures that the various clocks do not drift unacceptably. As a consequence, the network can tolerate short periods (where "short" could be up to several minutes or even a few hours depending on the quality of the clock) without clock discipline and yet continue running reliably.

This timing architecture provides synchronisation of both rate and time/phase. Clocks will not only run at the same average rate (providing rate control) but the devices can meaningfully pass absolute timing information to each other.

Certain embodiments assume that senders and receivers in a network have a shared view of time in the form of a clock which provides both phase and frequency information. This clock is usually implemented by representing time as seconds/nanoseconds and synchronising slave clocks to a master device via a network time protocol.

Figure 3B:
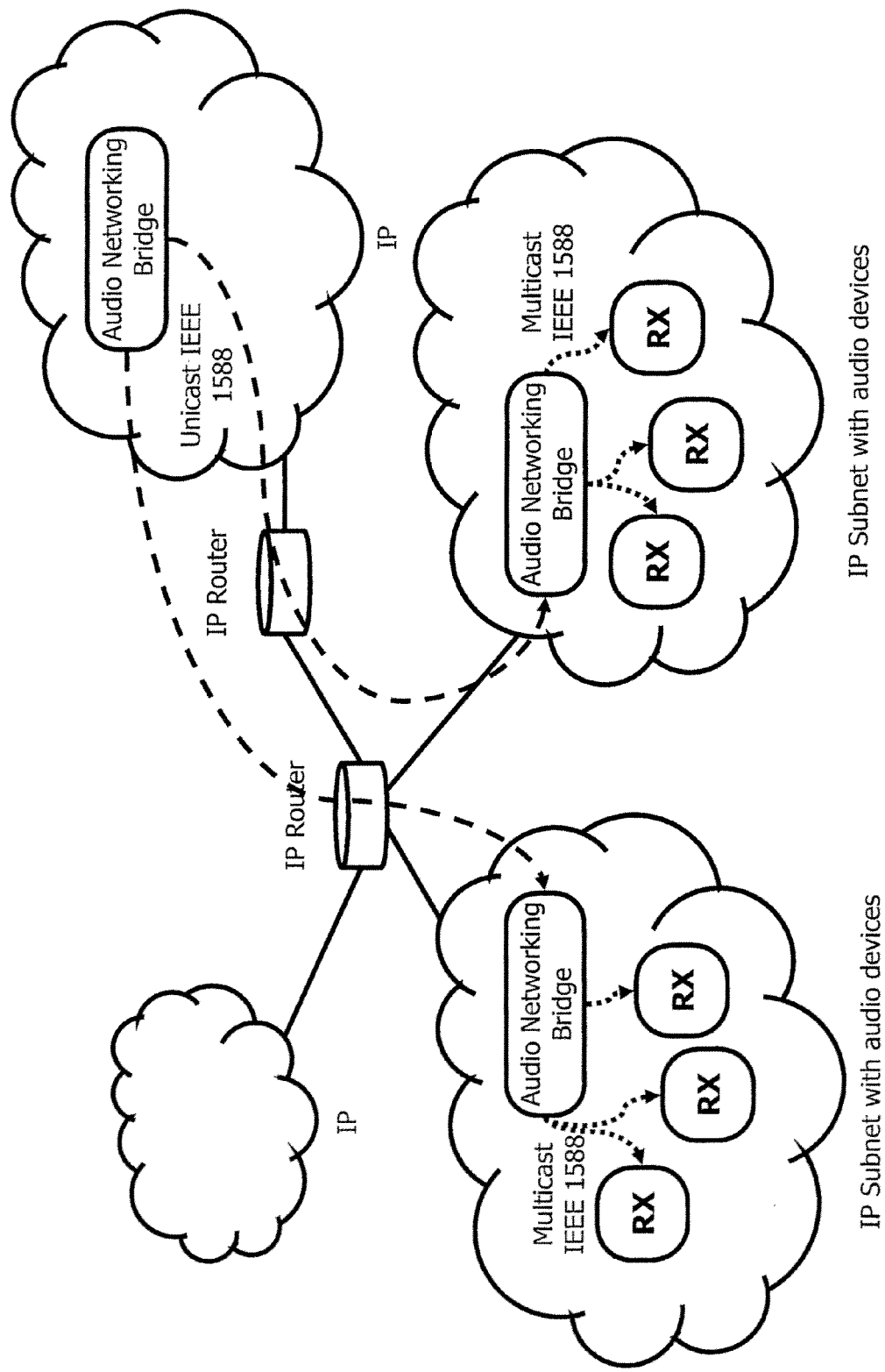

A given network may be divided into several regions for administrative or scalability reasons and each region may have a master clock. For example, as illustrated in FIG. 3b, the clocks may be arranged in a hierarchy. As illustrated, master clocks for networks in different geographic locations may be slaved to a time source such as GPS. For example, a master audio networking bridge may unicast according to IEEE 1588, thus providing a consistent view of time to the slave audio networking bridges throughout the network. The slave audio networking bridges in turn may multicast according to IEEE 1588 to provide a consistent view of time to various audio devices (shown as RXs in FIG. 3b).

The buffer at the receiver may be used to compensate for sender and network timing jitter. The receiver buffer may be thought of as extending from time zero (a time instant shared by the sender and the receiver) to a time in the future which is a $N*T$ where T is the sample period of the signal and N is the number of samples which can be stored in the buffer. The buffer position for storing a sample can be computed by adding the receiver latency for this channel to the timestamp in the received audio packet.

Figure 3C:
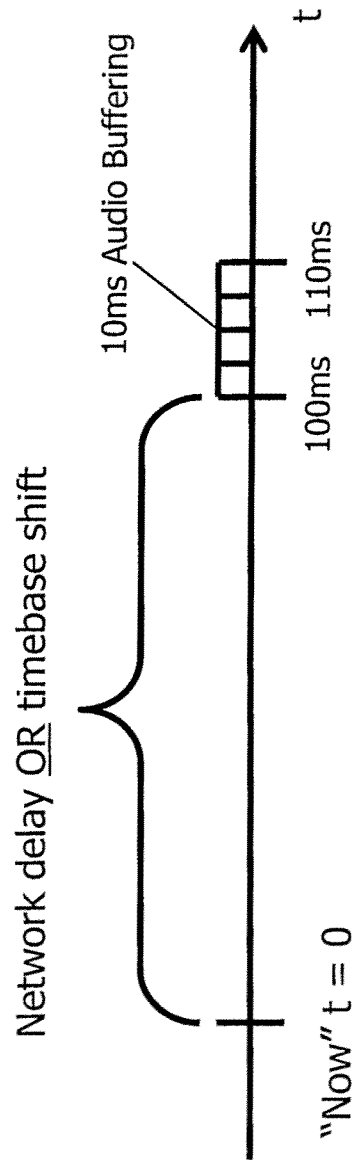

However, the receiver buffer does not have to begin at zero—it may begin later. Consider a network with a long transmission delay (i.e., 100 ms) between a sender and receiver which has enough buffering for only 10 ms of audio samples. Providing that the packet inter-arrival times are contained within 10 ms, the receiver can successfully receive audio by starting the receive buffer at zero+100 ms, thus implying a buffer end time of 110 ms as illustrated in FIG. 3c.

These observations about receiver buffer time span can be used to support networks with more than one time base. In such networks, clock masters are assumed to have stable and accurate frequency sources but they may have different absolute time bases (e.g., their second/nanosecond phase information is different). Highly stable frequency sources are readily available (e.g., Antelope Audio Isochrone 10M, which uses a rubidium oscillator to produce an accurate 10 MHz frequency source). Another stable frequency source is GPS—which may be used to discipline local master clocks for frequency without setting absolute seconds/nanoseconds time.

Figure 3D:
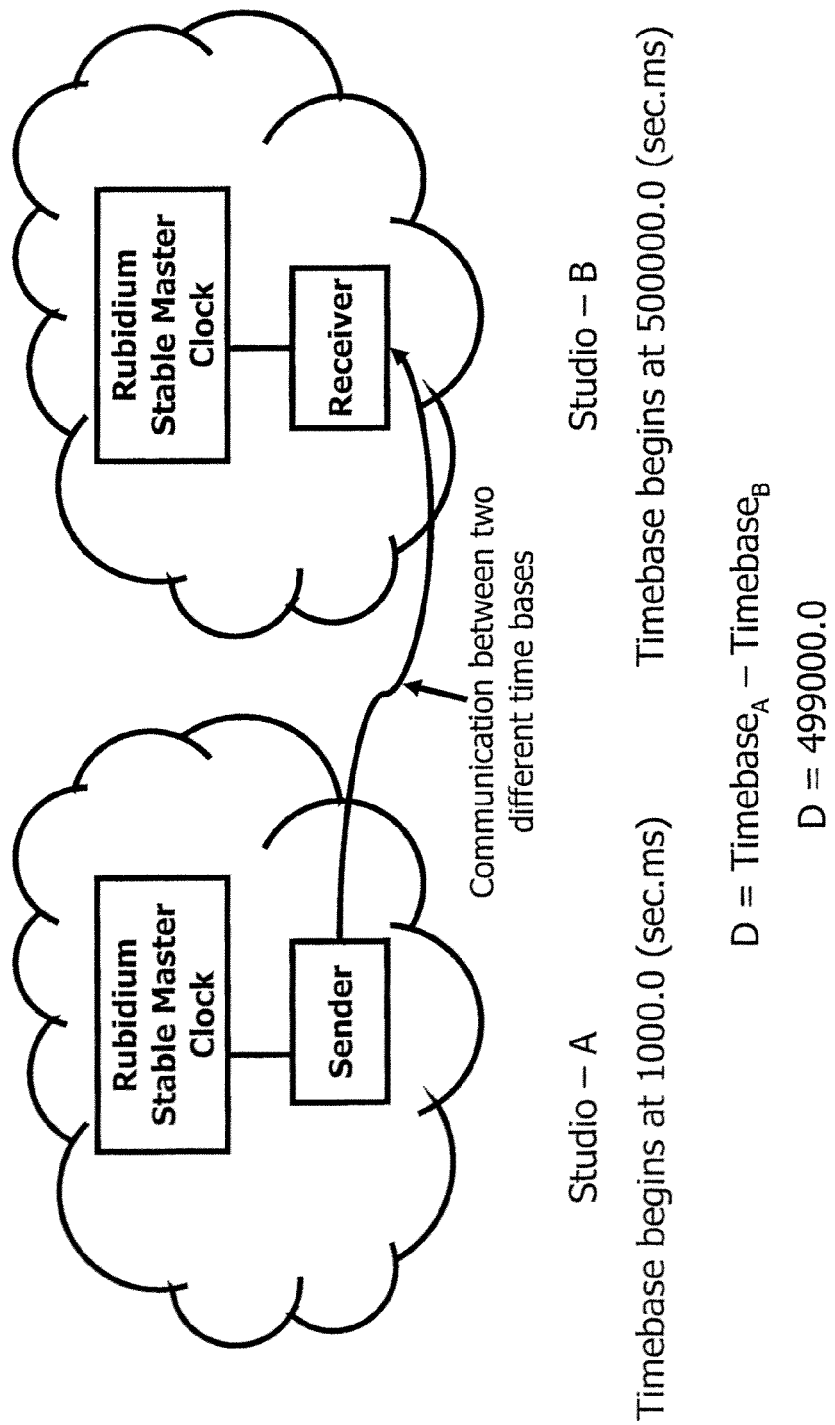

FIG. 3d illustrates an exemplary configuration in which there are two studios, Studio-A and Studio-B. Studio-A is operating in a first network having a rubidium stable master clock maintaining the time with a timebase that begins at 1000.0 (sec·μs) Studio-B is operating in a second network having a rubidium stable master clock maintaining the time with a timebase that begins at 500000.0 (sec·μs). When a sender in Studio-A transmits data to a receiver in Studio-B, there is a difference due to the different timebases of 499000. As illustrated in FIG. 3d, the receiver in Studio-B may compensate for the difference in time bases between the two networks by subtracting the time base difference when making the sample buffer position calculation.

In certain embodiments, the Buffer Position=((packet_timestamp_sec_ns+(timebase_B−timebase_A))/T+RX_Latency)mod N Where:

The receive buffer is circular buffer and stores N samples

RX Latency expressed in samples

T is the sample period

Media data has two obvious time bases. The first is natural time: seconds, nanoseconds, and the like. For media that is presented at a fixed rate (e.g. audio samples, video frames), it can be easier to measure time in these units (which we will generically call 'samples').

Timing systems have some concept of 'epoch', or time 0. This might be a particular date (midnight, Jan. 1, 1970 for POSIX systems), or just whenever this iteration of the timing system started. Times are represented as an offset from epoch.

Some time formats are a simple counter of the smallest represented unit from epoch. For example, a system might represent time as a number of samples since epoch. Converting to higher units requires dividing the counter down. Other formats use a hierarchical representation, such as seconds+nanoseconds or seconds+samples since epoch. This can be more convenient for some applications.

An advantage of using a sample-based rather than natural time measurement is that sample based processing is generally concerned about how many samples have elapsed, not how many seconds or nanoseconds. Converting from natural time to sample counts generally doesn't divide evenly below seconds, so various rounding effects appear in converted times, making them less convenient to work with. Systems that express time as floating point or other fractional representations have a similar problem.

The disadvantage of samples is that they may only be useful if everyone is using sampled media data with a common sample rate. Heterogeneous systems or systems dealing with non-periodic data may thus prefer a natural time format. For example, aligning audio and video or audio with different sample rates is more obvious using natural time.

Note: the use of seconds+nanoseconds as a natural time measure is an example. This doesn't preclude the use of milliseconds, microseconds, days, or any other natural time measure.

Times in the specifications below might be represented as microseconds (or another natural time format) or as samples or in a completely different time format. A mechanism for standardising the time format is assumed to exist. This might be as simple as specifying that a particular instance of the invention always uses a particular time format.

In certain embodiments, all, substantially all, most, or some data sent across the network may be timestamped using this shared network time. Thus, any receiver with a correctly disciplined clock can accurately time every item of media data, regardless of the transmission delay. If the receivers of a single item of media data are instructed to play it at a particular time, they can play it at the same time regardless of differing delays in the intervening network. Timing problems thus reduce to "can this signal get there quickly enough?" and "how can I minimise delay?".

Media timestamps usually come in two varieties: "presentation time" and "source/sender timestamps". "Presentation time" timestamps represent the time that the sample is to be played or "rendered". "Source/Sender" timestamps represent the time that the sample was collected rather than when it should be presented. Preferred embodiments utilize "source/sender" timestamping since it simplifies latency management and allows samples to be easily time aligned for mixing.

However, certain embodiments disclosed herein may be applicable to systems using presentation time stamps by subtracting the constant delay which is included in the presentation time. Exemplary systems using presentation timestamps are: Firewire/1394, MPEG, and more recently the AVB standards effort (which inherits from Firewire). Typically these systems assume a constant delay for transmission (e.g. 2 ms for AVB) and senders timestamp outgoing packets with time_now+constant_delay as a presentation time for each media packet.

Typically, the timestamp on an item of media data reflects when that data was created. Thus, the source of a signal might timestamp each signal with the time it was digitised (e.g. entered an analogue to digital converter) or synthesised. Timestamping creation time (rather than, say, transmission time) allows the timestamps of signals transmitted by different devices to be meaningfully compared and aligned.

In practice, this creates complexity, especially for devices whose inputs have different delays. Thus, timestamps in packets may be taken at a convenient point in the sending device (for example, when samples enter the digital domain), and an additional parameter representing the delay between source time and timestamp may be passed to receivers.

Note that timestamping every item, or substantially every item, of media data does not require that a physical timestamp be added to every sample of audio data (for example). If 20 samples of periodic audio data from a single signal are sent in a packet, then simply timestamping the first sample also implies the timestamps for the rest.

Latency is the delay in or through a signal transmission path. For example, an item of media data that is timestamped at a point in time and is not available for playout at the receiver until two microseconds later has a latency of two microseconds.

In certain embodiments of the present disclosure, the latency may be bounded by certain constraints. A lower bound may be the latency of each channel in a group (described below). An upper bound may be the maximum supported latency (usually buffering limited) for each channel in the group. For example, the total latency supported by a receiver may be dependent on buffer size. A receiver that can buffer 256 samples (5.3 ms at 48 kHz) can store any single sample for no more than 5.3 seconds without having buffer overflow errors. A system with long transmission delays can handle latencies longer than 5.3 ms as long as it can be certain that no sample will reach the receiver earlier than 5.3 ms before play-out time. For example, a transmission media where packets take at least 2 ms to reach the receiver could allow for 7.3 ms latency. In an unbridged Ethernet environment, it may be possible to deliver packets quite quickly, thus assuming that buffer size=max supported latency may be desirable. Additional restrictions on minimum or maximum value might be configured into the system (for example, by a user).

Latency has implications for time-aligned playout. If it takes two microseconds to reliably move data from the point where it is timestamped to the receiver ready for playout, then the receiver must playout the media data at least two microseconds after the time indicated by the timestamp. It can wait for longer, but if it chooses a shorter delay then the data may not yet have arrived when the receiver attempts to play it.

In certain embodiments, media data may be timestamped by transmitters (e.g., by writing a timestamp for the first sample in each packet and extrapolating for the remainder). Each receiver may have a "latency offset" value that is added to the timestamp to determine the play-out time. A service discovery protocol or other mechanism may be implemented that allows transmitters to notify receivers of the minimum latency offset that the transmitter recommends. Receivers can combine this value with local values to determine a suitable offset for play-out. Additionally, the latency offset can determine the maximum buffering by the receiver because the receivers usually must buffer samples from when they are received until the play-out time.

Factors affecting the offset provided by the transmitter might include one or more of:
  transmitter clock and timing jitter (if the transmitter might send delayed packets, this can be compensated for in the offset);
  transmitter processing time;
  time to clock packet onto the network; and
  network travel time.

Factors affecting the offset local to the receiver might include one or more of:
  clock and timing jitter (clock skew between transmitter and receiver can make the travel time seem longer (receiver clock is earlier) or shorter (receiver clock is later));
  receiver processing time; and
  network travel time (since sender might not know much about the network).

In certain embodiments, the receiver could also measure the difference between received packet times and the local timestamp to get an estimate of the latency (using the longest value received). If this measurement is smaller than the transmitter's estimate then it would be the most conservative to use the transmitter's estimate (although this is not required), since it likely includes compensation for transmitter timing jitter. This jitter might not show up even over several seconds of sampling. To allow for latency in the system, the receiver may offset its playout time by a fixed amount from the synchronised global clock. A sample timestamped by the transmitter as T will be played at T+X, a sample timestamped as T+1 will be played at T+X+1, and so on. If X is too small, then some or all samples will have insufficient time to make their way from the transmitter to the receiver and will not be played out. If X is too large, then real-time receivers may be too slow in playing out their samples, creating delays noticeable to actors, musicians, the audience, or other applicable users. X is also limited by the size of the receiver's sample buffer; if there is too great a delay between when the sample is received and when it is played then the receiver might not have enough storage to hold all the samples.

For example, the buffer on a lightweight device might be 256 samples in length, and the transmitter might send 20 frames worth of samples in a packet. Other suitable buffer sizes could be any number of samples in length, for example, 8, 16, 32, 64, 128, 512, 1024, 2048 or more samples in length. At 96 kHz, 256 samples is approximately 2.7 milliseconds, and 20 frames is about 200 microseconds. Assuming perfect clocking and no transmission or processing delays, it would take the transmitter 200 µs to collect the samples for the packet, so any value of X less than 200 µs (20 samples) may cause samples to be missed. In contrast, a value of X greater than 2.7 ms (256 samples) will write samples outside the range of the buffer. Allowing for transmission and processing delays, the device described might use a default latency of 1 ms (1000 µs, 96 samples).

X is known as the receiver latency offset (or just latency offset)—the time offset in the receiver to compensate for latency.

Transmitting a signal across a network can take a relatively long time (hundreds of microseconds or more on 100 Mbit Ethernet, especially with multiple switch hops), and this time can be variable. For example, consider an analogue signal entering a transmitting device (e.g., from a microphone) and being played out by a receiving device (e.g., a speaker). There are a large number of processing steps in between, and each can add a delay. The sum of these delays is called latency.

First, the transmitting device needs to convert the analogue signal to a stream of digital samples via an analogue to digital (A/D) converter. It then buffers a number of such samples together to form a packet before transmitting the packet as a sequence of bits onto its network interface. The A/D converter requires a certain amount of time to process the signal, then an additional delay is accrued while waiting for enough samples to be collected, and finally it takes time to assemble the samples as a packet and "clock out" each bit through the network interface.

The packet must travel, as a sequence of bits, over the network to the receiver. In doing so, it might pass through one or more switches, each of which must read the packet off the wire (assuming a wired network, though a wireless link works equivalently), possibly buffer it for processing or to wait for another wire to become available, and then write the packet, again as a sequence of bits, onto another wire. Reading the bits on and off the wire takes time, as does processing and buffering the packet. If the intended destination wire is already busy, quite significant delays might be accrued.

Finally, the receiver must read the packet off the wire, present it for buffering and processing, and finally run each sample through a D/A converter and pass it to the analogue circuitry for playout.

In addition, real world clocks are not ideal. In some cases, errors due to imperfect real world clocks cannot be distinguished from transmission delay. In these cases clock jitter or processing delays may cause some data to appear as if it were sent "late", further adding to latency.

Figure 4:
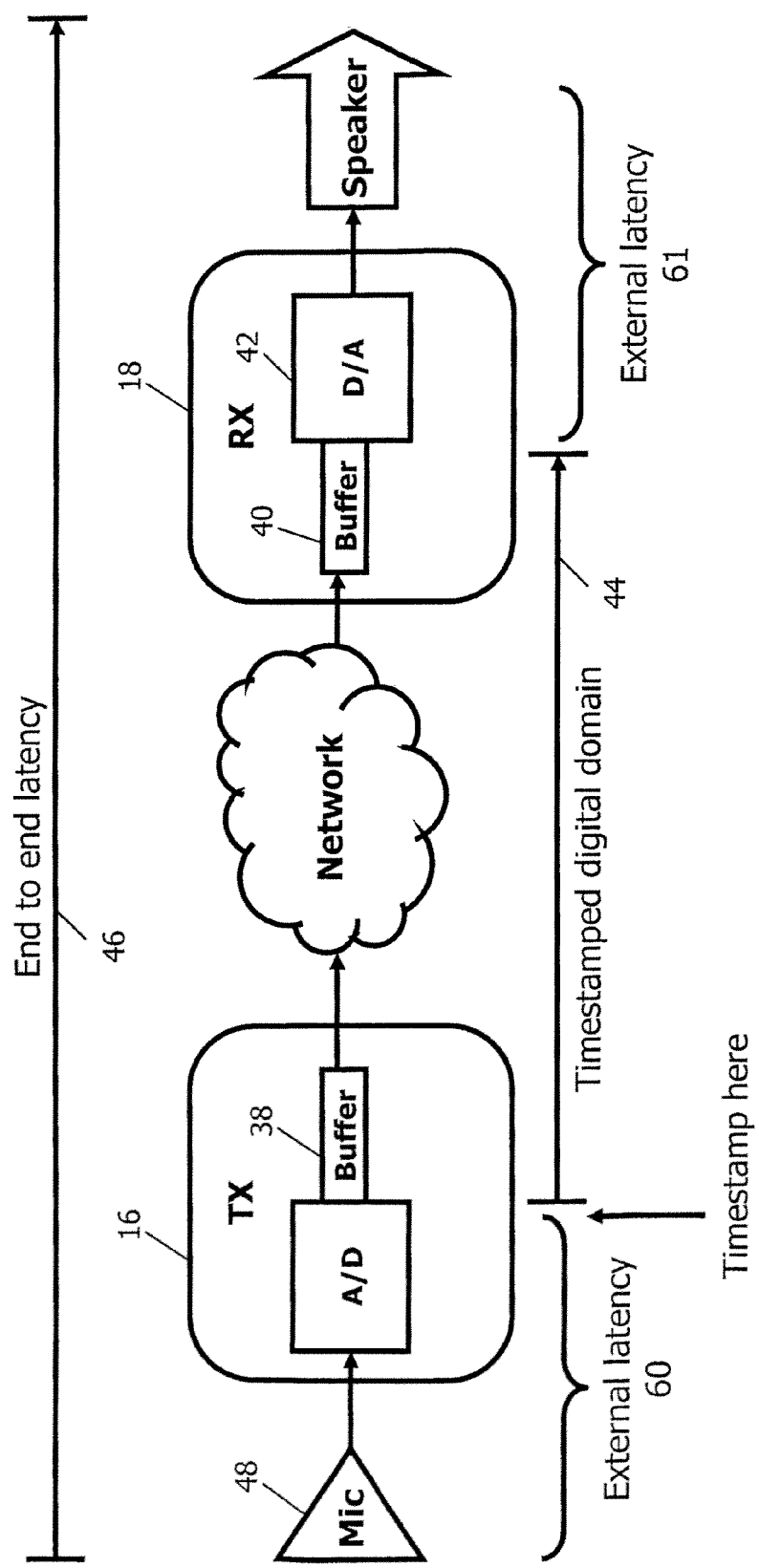
FIGS. 4 and 5 are schematic diagrams showing the latencies of a data network in accordance with certain embodiments.

In certain embodiments, with the factors above included, there are two distinct latency values that might be useful to the system. Referring now to FIG. 4, the first 44 is the latency from when the packet is timestamped 38 (and enters the "timestamped digital domain") to when it is read from the receiver's 18 output buffer 40 and passed out of the system (eg to a D/A converter). This latency 44 thus measures the latency across the digital media network, and is the latency that must be accounted for by the receiver's 18 "latency offset" when reading samples from the buffer 40. Transmission latency can be obtained in several ways. For example, in certain embodiments receivers can measure it by comparing their time with the time of samples received. In other embodiments, transmitters can provide an estimate of their own latency and receivers can use this in their own heuristics.

Processing occurs outside the timestamped digital domain too. The second latency 46 measure is the end-to-end latency through the system, from when a signal is sampled 48 to when it is played out 50. This includes the latency through the digital media network 44, and thus 46 must be larger than the first 44. Processing latency should generally be well known or published for any given device, but could also be obtained through measurement.

The simple case is sending a single signal (or a single set of synchronous signals) from a single transmitter to single receiver. Things become more complex when dealing with multiple transmitters and/or multiple receivers.

When a single transmitter sends a single packet stream to multiple receivers, each receiver may have a different latency through the network. Similarly, receivers may be playing out via different devices with different total latencies. To achieve synchronous playout, the receivers may be configured such that the end to end latency for the single signal is the same across all receivers. This may or may not be the same as having the same latency offset.

In the case of multiple transmitters, different signals may have different total latencies. This could also occur for separate signals from a single transmitter (example: audio and video may each have a different latency). Different sampling mechanisms or transmission paths will also lead to different end-to-end latencies. If the receiver wants to keep the playout times synchronised, it must engineer the same end-to-end latency for each signal. Thus the latency used for all signals must be large enough to accommodate the worst case of any applicable signal's latency.

To achieve synchronous playout in the case of multiple receivers, it may be desirable that each receiver has the same, or substantially the same, end-to-end latency. Thus, all such receivers may be configured with a latency that meets the minimum latency required for any signal received by any receiver in the set and the maximum latency supported on any receiver in the set. Each receiver can convert the end-to-end latency value to a suitable latency offset for its buffer.

A pair of mechanisms for automatically setting appropriate receive end-to-end latency and latency offsets may also be used.

The first mechanism allows a transmitter to propagate local latency measures 60 for a signal to receivers. Receivers can then add latency measures for transmission time and receiver processing to derive an end-to-end latency measure (and thus set a latency offset).

The second mechanism allows a group of devices receiving a common source signal to negotiate a common end-to-end latency 46. This negotiation applies per-signal. Devices receiving a signal for playout need to share the same end-to-end latency for that signal. The resulting offsets on each device may differ.

Both devices and signals may be grouped. The set of devices participating in a single group for a particular signal will negotiate a common end-to-end latency. There may be devices also receiving the same signal but not in the group; these devices will not directly affect the negotiations. Similarly, a latency may be applied to a group of signals rather than just one. In this case, the highest latency for any signal in the group will determine the latency for the group.

Latency can be introduced at many points in the transmission path from signal creation to signal playback. Some of this latency is introduced outside the digital timestamped domain, and other latency is introduced within it. In certain embodiments, each can be handled separately.

In certain embodiments, when compensating for latency and calculating a latency offset, a significant value may be the worst case latency. A goal of certain embodiments is to minimize total latency while ensuring that minimal or no data is lost. If a system has a generally low latency value with occasional spikes (for example, because of clock jitter, unusual processing delays, or occasional network congestion) then it may be desirable that the latency estimates be sufficient to ensure that the spikes do not cause significant data loss.

Since the receiver typically has an accurately synchronised clock, and because each audio packet contains a timestamp representing the time at which the sample entered the digital domain, the receiver has the ability to measure the distributions of packet inter-arrival time (i.e., packet timing jitter) and the distribution of latency from the sender to the receiver (i.e., by calculating the difference between the time the packet is received and the timestamp in the packet). In certain embodiments, a receiver could measure these distributions and use it, among other things, reporting on the quality of the connection and ensuring the validity/safety-margin for a given network setup.

An advantage of having the sender advertising the worst case latency is that a receiver typically will have a parameter before it has audio packets that it can use to measure the parameter. Measuring audio packets also adds delay to the routing setup, and it can take a long time to get reliable estimators for distributions with unlikely outliers (for example, the software drivers typically operate with quite low latency, but 1 in a million audio packets comes out quite late because the operating system is running another thread). The worst case provides a conservative estimate. However, in certain embodiments, values other than the worst case can be used such as values obtained by measuring latency distributions at the receiver or transmitter.

The sender typically advertises one or more of:
input delays (usually a fixed number);
packetisation delays (usually a fixed number); and
a timing distribution of packets as they enter the network from the sender (the network may further jitter the timing of packets, but the sender will not have access to that information).

In certain embodiments, the sender can advertise the timing distribution with a distribution type (e.g., Poisson) and the relevant parameters for that distribution (e.g., $\lambda$). In other embodiments, the sender may announce the latencies which would result in, for example, about 99.999%, about 99.9999%, about 99.99999%, or about 99.999999%, of packets being successfully receiver by a directly connected receiver with no transmission errors.

Figure 5:
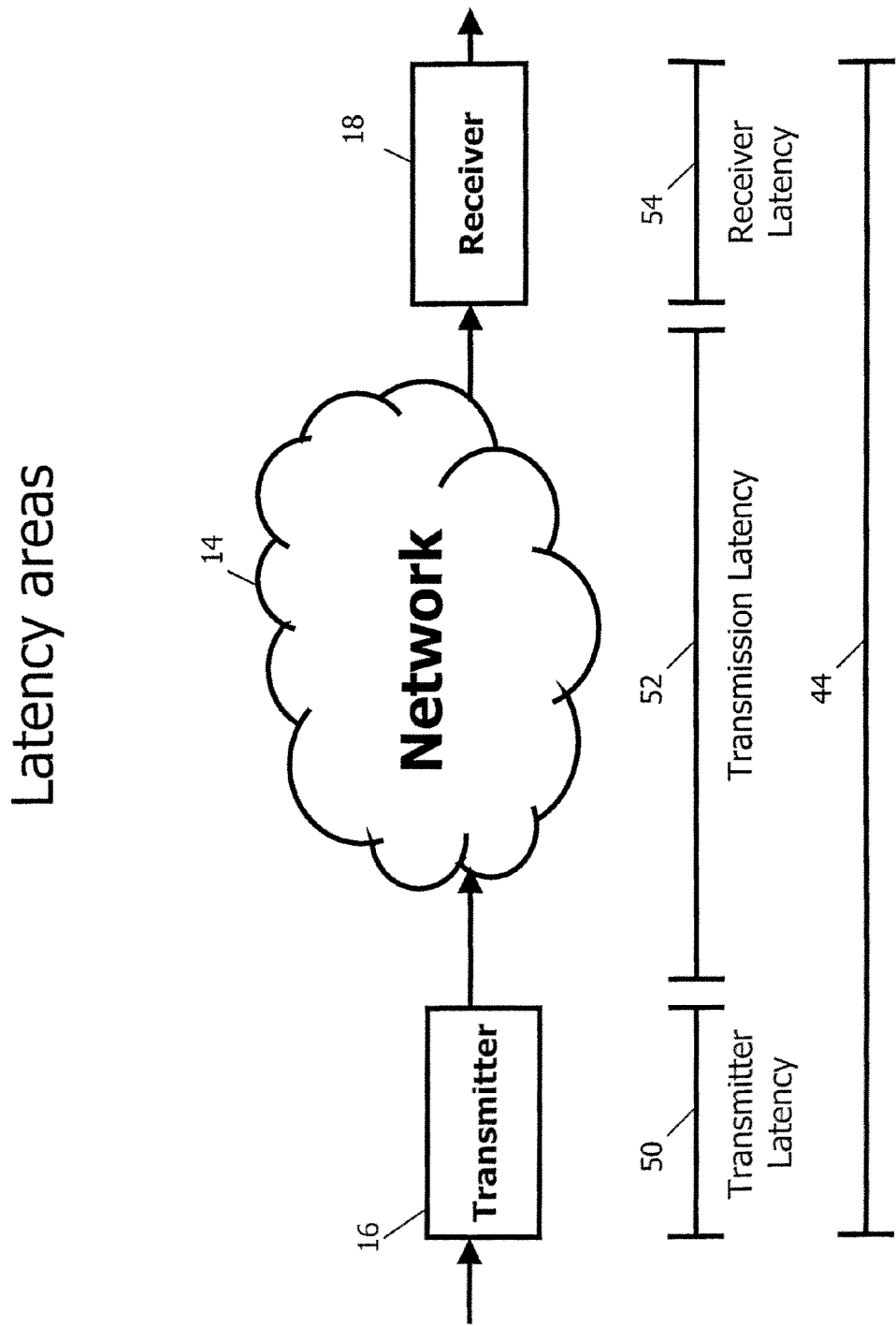

Referring to FIG. 5, for the purpose of quantifying latency within the timestamped domain 44, latency can be divided into three main sources:

latency within the transmitter 16, from timestamp point to network 50 transmission latency required to move the data from the transmitter 16 to the receiver 18 52 latency within the receiver 18 once the data is received 54

These latencies can be summed. The total latency in the digital domain 44 is the transmitter latency 50 plus the transmission latency 54 plus the receiver latency 56. Some unusual systems may have dependencies between the latencies, but in most cases they are independent (i.e., changing the transmitter latency doesn't affect the transmission.

Latency within the timestamped domain may be important regardless of whether synchronised output is used. The receiver 18 may choose a latency offset within its buffer (to compensate for latency) that is large enough to ensure no data is lost but small enough that the data will not overrun the buffer. Achieving synchronised end-to-end latency 46 adds additional constraints external to the timestamped domain. This latency will be referred to herein as "timestamped latency" 44.

Referring again to FIG. 4, latency outside the timestamped domain 44 is collapsed into two values:

Latency from when a data element is "sampled" to when it is timestamped at the transmitter 60.

Latency from when a data element is written to the receivers output buffer to when it is played 61.

This latency will be referred to herein as "external latency".

These are added to the latency from the timestamped domain 44 to obtain a total end-to-end latency 46 value. In general, they should be fixed for a given signal source or output. For simplicity, the following description does not describe how each latency is calculated or fed into the system, since the transmitter 16 has access to the pre-timestamping latency 60 and that the receiver 18 has access to the output latency 61 through an external mechanism.

In certain embodiments, for a receiver 18 to obtain an approximate timestamped latency 44 measurement on an existing stream, the receiver 18 compares the sample timestamps with its current time. For a low-jitter stream, the largest difference will provide a rough estimate of total latency.

In some aspects, care should be taken when using this value. Some streams have a maximum latency that is significantly higher than the average case latency, and in certain embodiments the worst case latency may determine whether transmission is glitch-free. If the worst case latency measured varies significantly from the average case then the total latency may be considered to have high jitter, and may need a larger safety margin.

End-to-end latency may be calculated by adding the values for external latency 60 and 61 to this value 44.

Alternatively, a timestamped latency value 44 can be derived by combining latency values for each of the three areas 50, 52 and 54. This might be done if a mechanism to estimate the latency is not available or to protect the estimated value from a transmitter whose worst case latency is notably larger than its average case latency (i.e., highly variable latency).

A receiver 18 can be configured with a suitable value for its own contribution 54 to worst case latency. Similarly, a transmitter 16 can be configured with a value for its contribution 50, and can advise this to receivers 18. A configured value for the transmission latency 52 might also added and the total used as the total latency offset 46.

The transmitter and receiver values 50 and 54 can be compared to the estimated value as a safety check. If the estimated value is too low compared to the transmitter's calculated latency then this can indicate that transmitter will occasionally suffer from long latencies; the estimated value might be increased to protect against this.

The maximum transmission latency 52 over a high-performance network (for example, gigabit Ethernet) that is not overloaded can be significantly smaller than the transmitter 50 or receiver 54 latency and thus can be included in the margin for error of those values. A lower performance network (e.g., wireless) may have a maximum latency that needs to be individually accounted for. For many systems, the upper bound on the transmission latency is known in advance, or at installation time. Commonly used fixed transmission latencies 52 in networked audio systems can include 10.33 ms, 2.66 ms and 5.33 ms.

Synchronised play-out may require that all receiving 18 devices use the same, or substantially the same, end-to-end latency 46, so that signals are played back at substantially the same time across all devices in a group. Once each receiver 18 has computed a workable end-to-end latency 46 for itself, it can share this latency with other devices that it is to synchronise with. The receivers 18 can agree on a suitable latency 46, which typically is at least as large as the largest individual latency for the group and typically is not more than the largest latency supported by any member of the group.

When synchronising live media (e.g., audio), transmission time is typically not the main focus. Rather, audio entering the system at the same time one or more points (e.g., via microphones) may be synchronised when it leaves the system at one or more points (e.g., via speakers or to storage media). In certain embodiments, a mechanism is needed to allow timestamps to be related to signal entry and exit times, and not just transmission times.

In contrast, the offset into the RX output buffers is typically only dependent on the timestamps and delay through the timestamped digital domain 44. There may be a minimum latency offset below which packets may be dropped, and a maximum latency offset above which the buffer is not large enough.

Each received signal typically has a minimum and a maximum latency offset.

In certain embodiments, the minimum latency offset is typically the latency required to handle the worst-case timestamped latency from the receiver 18. Signals written to the output buffer will typically be delayed by at least this much.

In certain embodiments, the maximum latency offset is the maximum latency supported by the output buffer of the receiver 18. Signals delayed by greater than this amount may be lost. A simple measure for maximum latency is size of buffer minus an allowance for any irregularity in the receiver's output processing. In practice, a maximum latency larger than the buffer size may be safe as long as the best case transmission time is sufficiently large. That is, it may be desirable that the maximum latency minus transmission time is less than the size of the buffer.

The above values are timestamped latency 44. End-to-end minimum and maximum latency 46 is obtained by adding the external latency 60 and 61 to these values.

For a single signal, the receiver may use a suitable latency offset to ensure minimal or no data is lost. To perform play-out synchronisation, it also may know the pre-timestamp latency 50. In an automatically configured system, the receiver 18 might not have prior knowledge of the latency characteristics of the transmitter 16, and thus may be able to obtain this automatically.

In certain embodiments, the transmitter 16 places its local latency values 50 into a database of information associated with the signal. In a dynamic environment, the signal name and characteristics can be placed into a database which the receiver 18 uses to find and connect to that signal. Adding the transmitter latencies 50 allows the receiver 18 to acquire the missing latency information at the same time as it acquires connection information. The receiver 18 then adds the values for transmission 52 and receiver 12 latency to form a total latency offset and end-to-end latency 46 and programs itself accordingly.

Should the receiver 18 connect to a different device 16 with a different latency 50, the receiver 18 can recalculate the maximum latency as appropriate. If a transmitter 16 does not provide a latency value 50 then a conservative default may be used.

Alternatively, the advertised transmitter latency 50 can be used to sanity check the estimated latency.

The transmitter latency 50 measures how long it takes a timestamped sample to reach the network. It includes buffering delay: delay while the first sample or frame in the packet waits for the remaining samples or frames in the packet to be acquired. It also includes allowances for irregularities in the sender's output; if jitter in the packet processing can cause packets to be delayed up to (for example) 5 ms before being transmitted then receivers need to allow for this.

The total latency through the digital domain 44 can be measured by the receiver 18. This value should be compared to the transmitter's RX latency 50 to identify irregular transmitters.

The pre-timestamp latency 60 is the latency from when the signal was "sampled" to when it was timestamped. For example, this could be the time between when an analogue signal was sampled and when a timestamp was taken at the digital output of an analogue to digital converter (ADC). Like the transmitter latency 50, this may be advertised via some mechanism (e.g., a shared database such as DNS-SD over multicast DNS) and made available to most or all devices receiving a particular channel. This value is subtracted from the timestamp to obtain the true creation time of the signal.

This parameter might not be appropriate for all signals, either because they are being sourced from storage or because the transmitter doesn't have access to the information. In such cases, the value may be set 0 or omitted.

A "latency group" as described herein is a set of signals (e.g., a media channel) being received by a set of receivers that configure their latency offset (or other latency management mechanism) to obtain a single end-to-end latency 46. These signals may then be synchronised on playout. A latency group typically has an identifier to distinguish it from other groups.

Firstly, each receiver calculates the minimum and maximum end-to-end latency for each received signal that is part of the group. The largest minimum becomes the receiver's minimum, and the smallest maximum becomes the receiver's maximum. The receiver sets its "current latency" to be the same as its minimum.

It is possible, though unlikely, that the receiver 18 finds that there is no legal value; the largest minimum latency is larger than the smallest maximum latency. In this case, the receiver may log an error to some form of administrative interface and suspend membership of the latency group. The most likely reason for not being able to find a legal value is that the difference in external delays on two different signals are greater than the receiver's buffers can compensate for.

Once initialised, each receiver 18 can use a shared communication medium (e.g. a database or a custom multicast protocol) to notify the other members of the group of its latency values. An exemplary entry (or message) contains the following information:
  latency group identifier
  minimum latency
  current latency
  maximum latency For example, in certain embodiments the database might be able to store one copy of a record for each member of a group, with the records keyed to the "identifier" of the group. Each record might contain the minimum, current and maximum latency for that node. Members of the latency group may look up some or all of the records for that group to obtain a suitable latency value. A notification mechanism may allow other members to be informed when any record is updated.

In certain embodiments the contents of the database may be distributed across multiple nodes, while still approximating single database query and update mechanisms. For example, certain embodiments may use DNS service discovery, which uses the Dynamic Name Service database as a general-purpose database. In certain embodiments multicast DNS may be used, which is an implementation of DNS where queries are not sent to a specific server but multicast on the local network. Whichever node owns that query (if any) replies. Multicast DNS (and DNS) support multiple copies of a single record with a single name. For example, using the .TXT record type, a device could create a record for latencygroup1._latency.local, "latencygroup1" is an example of a group identifier, though it could equally be any string of alphanumeric characters. The contents of the record might be:
  devid="myname" (name of receiving device, "myname" for this example)
  min="500000" (minimum supported latency in nanoseconds)
  max="5000000" (maximum supported latency in nanoseconds)
  curr="1000000" (current latency in nanoseconds)

Note that in preferred embodiments only a single record would be made per receiver, even if there are multiple channels, because the receiver can set up min and max values that cover all its channels.

Advantageously, using a database for distributing information provides more information than simple multicast messages, since they make it relatively easy to get a complete view of the current state. It should be noted that the "current" field in the database or message may be omitted, but may be advantageous when the set of channels changes (for example, if new channels are added or a device goes offline). If all devices used the minimum across all device's records, then removing a device might cause the latency to be recalculated. This is sometimes what is wanted, but often not while audio is live. Similarly, having a "current" value allows a new channel to correctly pick the latency currently being used, and also indicate that it does not currently have a latency.

In certain embodiments, each receiver may transmit data directly to the network as custom multicast messages. Under this model, there need not be a network-wide view of state; each receiver updates its current latency whenever another receiver's current latency is higher, and transmits the information every time its own values change.

In certain embodiments, a single device in the network could be dedicated to maintain the database, with receivers posting and querying this device to find out what latency to use. For proper distributed operation, a new device could be able to take over this role if the first device goes away.

Before posting its own latency information, each receiver first checks the existing information posted by other receivers (if any). If the current latency of another member is greater than the receiver's own current latency, it increases its current latency to match. It then posts its latency information. If the receiver's current latency is greater than the current latency of the other group members, then they will update their current latency when they see the post.

As each member posts their information, the current latency for the group will either remain unchanged or increase. If it increases, all group members will update their individual group latency to the new value.

Before changing the current group latency, a receiver 18 should validate that its proposed current latency is not larger than the maximum latency of any existing member of the group. If not, the receiver may log an error and suspend membership of the group. Similarly, if another group member raises the current latency to greater than a receiver's maximum latency, it may log an error and suspend membership of the group.

In certain embodiments, groups may be merged. For example, putting a channel in more than one sync group effectively merges the groups. Since a single channel can have only one latency offset, the shared channel would typically propagate the restrictions from each group to the other.

In certain embodiments, groups may be split. When splitting a group, there are at least two possible scenarios:
(1) the new groups maintain their current values
(2) the new groups negotiate new values If the groups maintain their current values, then the split will not cause any changes until an event occurs that is allowed to disrupt the current values.

If the groups negotiate new values, then either it may be a disruptive event (at which point it may be desirable to reinitialise the old groups) or a mechanism may exist for "drifting" latency offset.

In either case, it could be acceptable to have an algorithm that maintained for each channel the last "good" latency offset until a new offset was agreed upon (see below), and only then change the value. Groups could thus be reconfigured at will and would only have an effect when the system stabilised on a value.

In preferred embodiments, it is assumed that the system becomes "stable" (all channels in group have the same value) before playing media. The actual voting process can be accomplished within a few hundred ms (possibly shorter or longer depending on the status of the group), once all receivers have their own data. Stability can be measured by a mechanism that knows about all channels in the group; individual channels only know of themselves and the shared parameters.

Where possible, latency offsets should be calculated before live data transmission begins. Changing the latency offset is a quick process but is likely to entail a glitch as time 'jumps' relative to the receiver's buffer. Since offsets typically increase, a sample oriented system could end up playing a portion of the samples twice.

However, certain embodiments could include a mechanism for changing the receiver offset value while "live," in which case stability and skew should be considered. Firstly, devices preferably will not change their receiver latency values until they are relatively confident that the value they have is the one they want to use. For example, the time elapsed since the last change (e.g., 250 ms or 1 s or similar) might be used by the device. There may also be a potential issue that during modification skew might occur between the various devices.

Certain embodiments handle this by having a control system set up the flows and latency groups, monitor them until they stabilise, and then enable audio. At this point, the latency values may be locked so that they will not drift if an accidental change occurs. Locking is effectively setting the channel's legal range of latencies to a single value. This could be implemented on a channel-by-channel basis, or by a message to the group to "lock" the group's latency. Furthermore, new channels may be added to the group, but must use the "locked" latency value (or be unable to sync to the group). If values are to be changed, then the control system can explicitly unlock the channels, allow them to stabilise on a new value, then re-lock them. During this time, media can be suppressed to avoid errors.

In certain embodiments, the latency of a group may be lowered. Lowering the latency of the group implies that all receivers in the group switch to a new (lower) latency offset. Once switched, they will still have synchronised playout. During switching, it is often desirable not to glitch the audio in a noticeable way.

The algorithm described below computes a low latency for a set of receivers of one or more channels. If a specific receiver (e.g., a software implementation on a computer) causing the latency of the group to be large leaves the group, the receivers may be able to operate at a lower latency. Lowering the latency for a group without reinitialising the whole group can be done in various ways, depending on the application requirements.

For example, an increase in receiver latency may occur automatically when new members join the group since the new receiver has an opportunity to update the receive latency for the group. However, to reduce the latency of a group, receivers need to be notified that they should recapitulate the process of deriving an appropriate latency for the group. In certain embodiments an explicit message could be sent to receivers to cause them to recalculate and minimise their latency settings for a group. This message could be sent from time-to-time such as, for example, every minute, every 10 minutes, every 30 minutes, or every hour. In certain embodiments, it may be adequate to periodically minimise latency, say at 2 am. Since receivers have a synchronised clock, they could switch to a lower latency if necessary at the appointed time.

In certain embodiments, coordination may be achieved via the media signal that they share (e.g., switching during silence, stationary periods where the signal is essentially unchanging, a triggering tone, or some other signal property). For example, in a public address application, there are typically periods in which there is no audio (e.g., between bursts of speech, or between songs). In this application, receivers could detect absence of audio and renegotiate their latency down during a period of silence.

In certain embodiments, it may be advantageous to minimize audio and video artefacts when recalculating the latency of a group. These may apply equally to increasing and decreasing the latency. For example, audio glitching due to adjustment of the playout time could be ameliorated by one or more of:
- selecting an appropriate time (e.g. at 2 am when nobody is around);
- adjusting during a period of silence or low signal level;
- muting, making the transition and then unmuting (could ramp down and ramp up to mute or mute/unmute on zero-crossing boundaries);
- adjusting by one sample at a time over several seconds; or
- smoothing the audio affected by the transition period with signal processing.

For video, loss of a frame or repeating of a frame may be acceptable. Additionally, DSP techniques may be used to minimise any visible artefacts caused by the synchronisation transition.

In certain embodiments, a receiver may post a current latency of zero. This may be a special value that allows a receiver to become part of the group without risking modifying any other member's current latency. This is useful for implementations where a receiver can only discover information about other members by joining the group. Some implementations (eg a database) may allow browsing of entries without interacting directly with other members.

The RX latency value 46 shared between receivers 18 is the time delay between when data is sampled and when it is played out. It includes the time for the signal to pass across the network and into the receiver's output buffer and out of the digital domain 44 plus the delay until play-out 61 plus the pretimestamp latency 60 on the transmitter's 16 input.

In certain embodiments, it is assumed that a receiver 18 has access to the delay until play-out 61 for each of its channels. It also typically has access to its maximum buffer latency (determined by size of buffer) and minimum buffer latency 44 (determined by the latency between when a sample or packet is timestamped and when it is written to the buffer).

The minimum RX latency 80=pre-timestamp latency 60+delay until play out 61 and +minimum buffer latency 44.

The maximum RX latency 82=pre-timestamp latency 60+delay until play out 61 and +maximum buffer latency.

The current latency is the current RX latency for a set of channels on a receiving device (and by negotiation, the group).

The maximum latency is the maximum RX latency that a device can support. This is typically a function of the size of its play-out buffer.

The minimum latency is the minimum RX latency that a device can safely support, based on the current evaluated latency (see below for obtaining this) or some fixed value. Minimum latency is not required in the latency messages but may be included for monitoring reasons. In theory, the current latency of the group should be the minimum latency of some device in the group. If this is not the case then the current latency is higher than it needs to be. If minimising latency is important, it may be useful to reinitialise the group and thus lower the current latency.

If a single receiver 18 has multiple channels in a single group, it typically will calculate minimum and maximum latencies that accommodate all those channels. If no such value exists, then the receiver may log an error and suppress membership in the group.

One or more channels on a receiver 18 might be members of multiple but disjoint groups. In this case, the receiver may choose a current latency that accommodates both groups, effectively merging the two groups. In this situation, it may be desirable to explicitly merge both groups if possible.

This algorithm will cause offsets to increase only. Ideally, the current latency of the group should be the minimum latency of the member of the group with the largest minimum latency. If this is not the case, the administrator may wish to reset the offset to an appropriate level. A specific reset message could be provided to do this.

An unnecessarily high latency could arise if a member leaves the group after setting the latency. It could also occur if a receiver's latency has additional restrictions, such as membership in a second group (see above).

Once a receiver has been provided with a suitable current latency it must convert this to a latency offset by subtracting out external latency 60 and 61. This latency offset is programmed into the receive processing, where it is added to the packet timestamp in order to compute an output buffer position.

In a packet-based system using periodic sample data, it is possible to manage transmitter latency by changing the transmitter's buffering characteristics. Placing fewer samples in each packet reduces the time the transmitter must wait to collect all the samples, thus reducing latency. However, this means more packets which increases the load on the network (since packet overhead can be quite high compared to packet size).

Example

Figure 7:
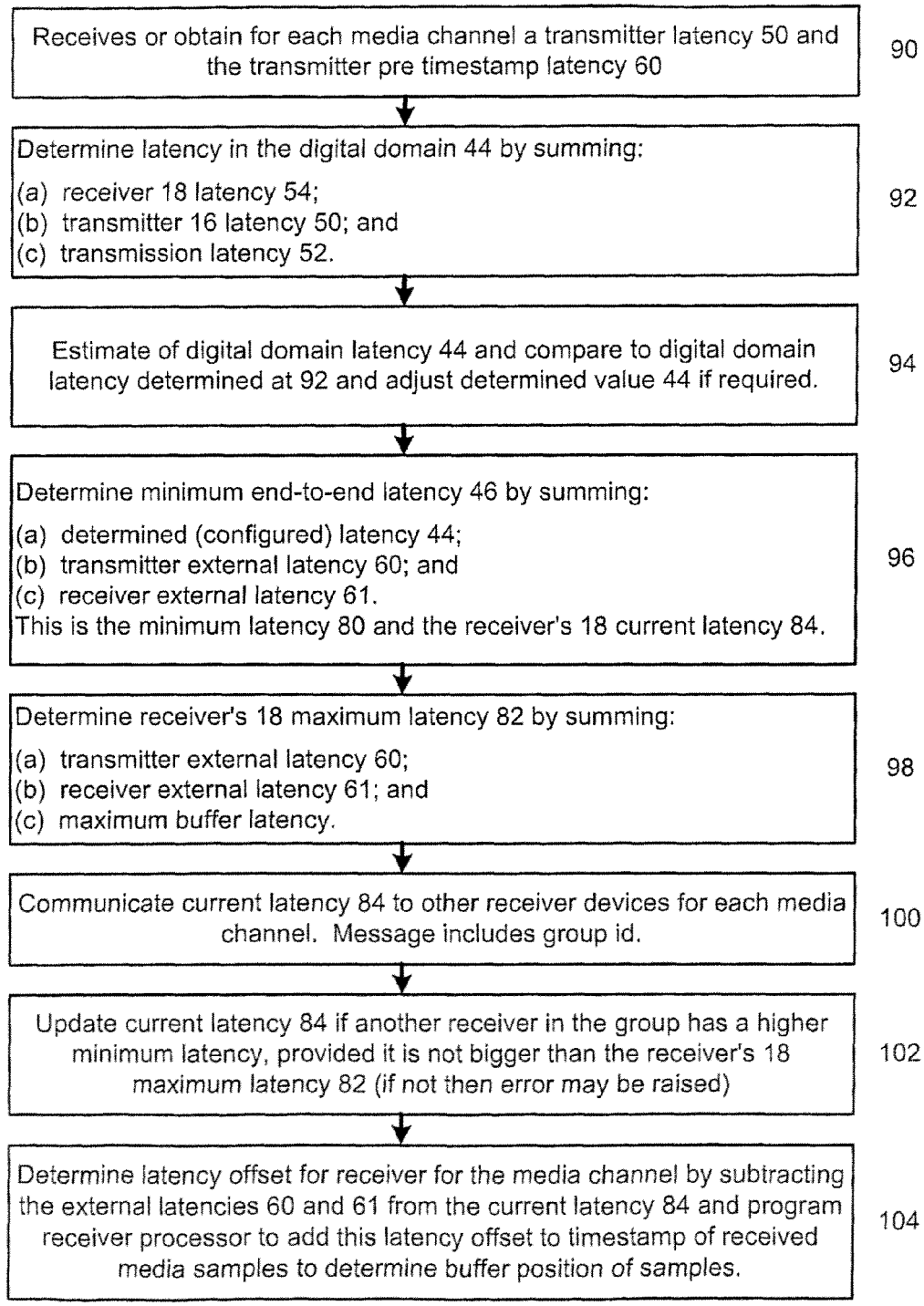
FIG. 7 is a flow chart illustrating certain systems, methods, and computer-readable media in accordance with certain embodiments.

The following example with reference to the flow chart of FIG. 7 describes the mechanisms for advertising TX latency and negotiating the receiver latency offset. In this example the following assumptions are made:

synchronised network time amongst participating devices.
transmitters timestamp their outgoing frames/samples with respect to this shared concept of time
that receivers can use the shared time and a frame's or sample's timestamp to time-align outputs.

Each transmitting channel has a local transmitter latency 50 and external latency 60 associated with it. These values are made available to receivers 18 via an entry in a shared database (eg DNS-SD). Receivers 18 should not choose a latency value smaller than value 50, and sum 92 the receiver latency 50 this with any other latency values 52 and 54 available to it in order to determine a configured timestamped latency 44.

Receivers 18 may be programmed with a suitable default if no transmitter latency 50 value is available.

The receiver 18 may compare 94 this determined timestamped latency 44 with an estimated timestamped latency (obtained by comparing timestamp of a packet to the current time) and adjust the determined latency if necessary.

Before participating in latency negotiation, the receiver 18 calculates 96 its own minimum latency 46 either through estimation 92, based on the transmitter latency, or just a configured value. A receiver 18 also has 98 a maximum latency value based on its buffers and external latency 60 and 61.

Figure 6:
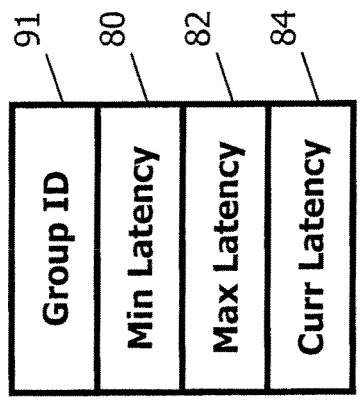
FIG. 6 is a schematic representation of the format of a message sent by a receiver in accordance with certain embodiments.

Receiver 18 participates in negotiation by sending 100 a message. A schematic representation of the message format is shown in FIG. 6. Latency values are in an implementation-agreed format. For this example, assume that they are seconds and nanoseconds since epoch.

The maximum latency offset 82 is a constant for any given channel on a receiver 18. If a receiver has no practical maximum, then a suitably large value should be used.

The minimum latency offset 80 is derived from the above calculations (transmitter latency+other latency).

The current latency 84 is the latency value currently in use by the receiver. It may be zero if no latency is currently set.

The message also includes an associated group id 91 of the group that the receiver wishes to be a part of.

The receiver 18 joins the specified latency group, which (in this example) is implemented as a multicast group, port, and group id. Upon joining the group, it listens for approximately 1 second to catch any existing traffic. If no messages on this group are received, it sends a message with current latency 0.

Upon receiving a message, each receiver 18 in the group can compare 102 the current latency in the message to its own current configured latency. If the message's current latency value is smaller than the receiver's current latency, then the receiver sends a reply to the sender of the message only providing its values. If the current configured latency of the received message is larger, it raises its own current latency to match. If the current configured latency of the received message is the same the receiver 18 ignores the message. If the current configured latency in the message is larger than the maximum supported by the receiver 18, it logs an error to some form of administrator and suppresses membership in the group.

Whenever a receiver 18 increases its current configured latency, it sends a message to all members of the group with the new current configured latency.

If a receiver 18 discovers that the current latency of the group is smaller than its minimum latency, it should first send a message to all members to obtain their current and maximum latencies (by claiming that its own current configured latency is zero). If its minimum latency is less than the smallest maximum latency it receives in reply then it may increase the current configured latency of the group (and its own) to its own minimum latency. Otherwise, it may log an error and suppress membership in the group.

Based on the negotiated current latency the receiver 18 operates to determine 104 a latency offset for each media channel it receives based on the negotiated current latency.

Latency configuration could also be implemented using a central database. Each receiver obtains the address of the database and then reads and writes to a named area of shared data. Values are as for the multicast example. With a central database, some additional mechanism is required to keep the receivers up to date. Receivers could poll the database, but it is better if the database has a callback mechanism that it can use to trigger updates.

A sophisticated mechanism could maintain a record for each receiver. This would allow the database to notice when receivers leave the group and (possibly) reduce the latency accordingly.

Security could be provided via a field with a shared secret or password or by applying an existing encryption technology to the messages.

Receivers are not required to reset the timestamp when processing a signal. It is possible to timestamp a signal at its original source and then asynchronously process that signal over several steps through several devices while preserving the timestamp. By setting an appropriate latency offset, a set of receiving devices can achieve synchronised play-out of the transmitted (and likely modified) signal even when the signal has travelled different processing paths.

Effectively, this adds processing steps as well as simple transmission to the end-to-end transmission paths.

For example, a mixer may decide to preserve the original timestamp on a set of (time-aligned) signals, passing them back out with the original timestamp. The only impact on downstream devices is that the latency appears larger. When advertising the transmitter latency of the new stream, the mixer should include not only its own transmitter latency but the latency acquired when transmitting the signals from their original sources to the mixer.

Obviously, anything which increases the latency may also require a larger receiver buffer to ensure no packet loss.

It is possible to create some effects by simply manipulating timestamps. For example, an echo effect can be created by simply jumping the timestamp of a set of samples into the future, thus delaying their playout. If the modified stream is retransmitted and mixed with the original stream an echo will be created.

Some devices may have buffering external to the digital packet processing. Such devices can support a larger maximum RX latency by using their external buffering.

Devices that deliberately delay output (such as audio delay compensation on speaker stacks) should negotiate RX latency based on nominal play-out time, not the delayed play-out time.

Figure 8:
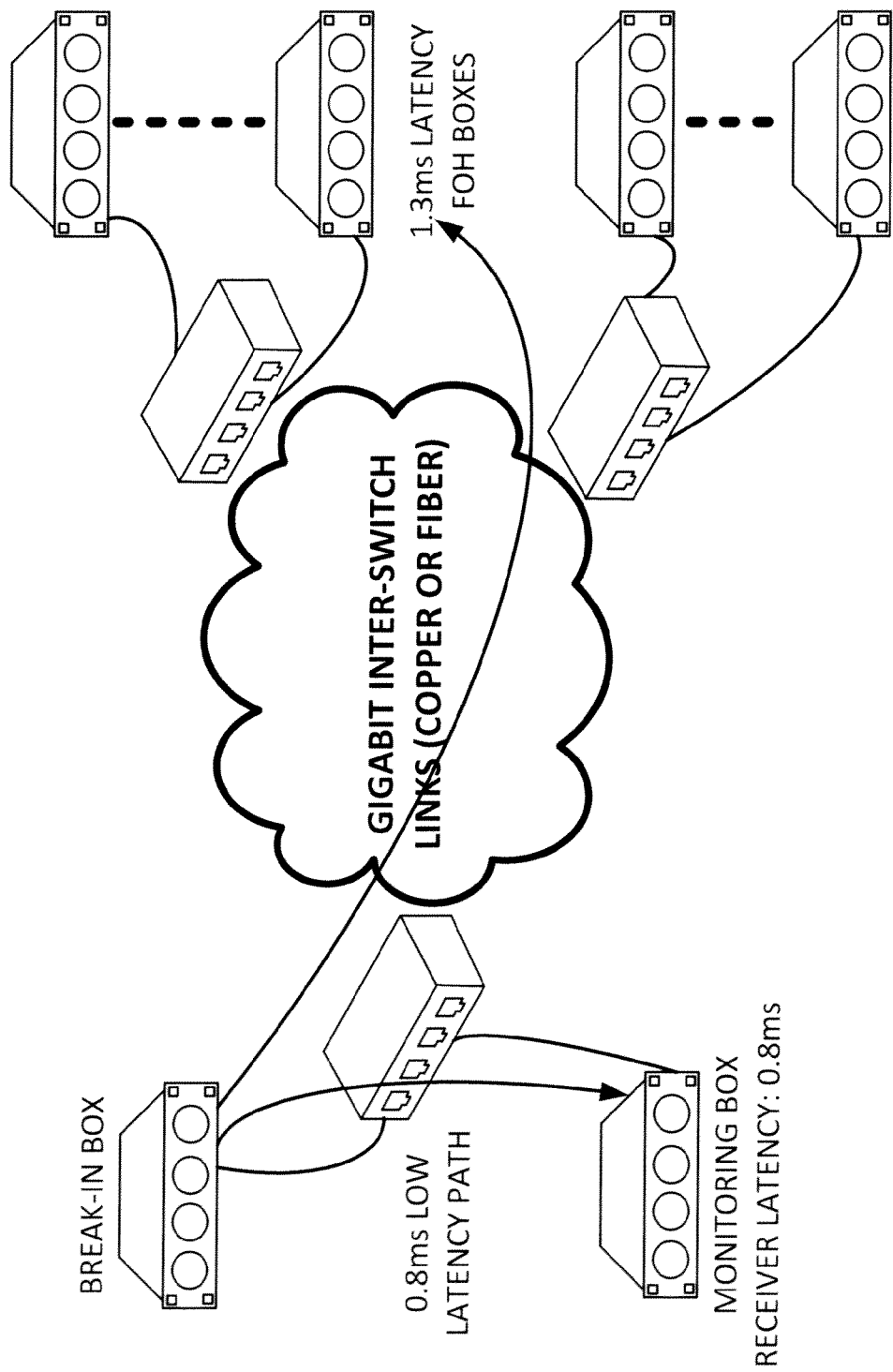
FIG. 8 illustrates a data network in accordance with certain embodiments.

Certain exemplary embodiments may achieve sync across the network by consistently setting a default receiver latency on all the devices in the network. An exemplary system in accordance with these embodiments is illustrated in FIG. 8. If used, the default receiver latency implies that all receivers will play out audio in synchrony throughout the entire network. This default receiver latency may be configured using software running on a management console supplied with the equipment.

In these embodiments, a software node may be used to send audio to a processor that cannot meet the timing required by the default receiver latency. In this case, the default receiver latency may be overridden by the software implementations' advertised transmitter latency. A management console may be further able to set the default receiver latency lower on specific receivers, thus allowing certain paths/receivers in the network to have lower latency and operate without being in sync with every other device in the network:

Embodiments of the present disclosure may be applicable to both compressed and uncompressed audio and video. Typically, compressed audio or video is rendered to a constant bit rate sample stream of periodic sequence of frames. The latency management techniques discussed above ma be used to ensure that the CBR stream outputs from the decoder are time-aligned with another signal on another device.

The techniques disclosed herein are well suited to managing latency in networks with compressed media. In the case of compression codecs, additional latency is typically incurred in the sender and the receiver due to the codec processing overhead. The sender and receiver codec delays can be easily accounted for by embodiments of the present disclosure by the sender advertising the compression delay as an input delay. Receivers can therefore learn the sender latency due to compression and can compensate for it automatically. Further, the receiver can compute appropriate latency values which include the output delay due to decompression processing and can communicate the calculated latency to other receivers in a sync group that wish to synchronise with the media signal.

In conventional systems, the user of a system manually inserts delays into their signal processing chains to ensure that all signals exit a media system in alignment. For example, media systems handling audio and video together (e.g., television broadcast) usually pass the video signal through specialised video processing equipment and audio signals through specialised audio processing equipment. The audio and video may enter the system time aligned, however the video and audio processing paths are different and may have very different latencies. Video codec processing usually adds significant delay (10s of milliseconds). The audio is usually completed with much less delay than the video processing and so it may be delayed in order to remain in sync with the video when it leaves the processing system.

Embodiments in accordance with the present disclosure may have many advantages. However, no particular embodiment will necessarily have any or all of the described advantages.

An advantage of certain embodiments is that end-to-end latency may be minimized while achieving synchronisation.

Another advantage of certain embodiments is that several heterogeneous transmitters and several receivers may be synchronised.

Still another advantage of certain embodiments is that a transmitter or receiver might deal with multiple different signals.

Still a further advantage of certain embodiments is that signals having strict latency requirements (e.g., live audio play-out) can be synchronized, while others that are less strict can also be synchronised.

Yet another advantage of certain embodiments is that devices that cannot handle tight latency requirements may be accommodated. For example, specialised hardware can keep tight clocking, while PCs may need a much more generous latency due to clock jitter. As another example, gigabit Ethernet has very low transmission times and is very reliable, while wireless is much slower and could need to retransmit data.

Still another advantage of certain embodiments is that unreliability in the system may lead to increased latency allowance, which in turn makes the system more forgiving of varying latencies.

A further advantage of certain embodiments is that latency may be measured based on a shared reference clock and therefore delays in the transmitter and through the network have little or no effect on playout timing.

Another advantage of certain embodiments is that there is no need for a user to account for processing, switch hops, variations in network load, different devices, etc. in implementing a media network.

Still a further advantage of certain embodiments is that the methods and systems can automatically determine a "safe" but "small" latency allowance to be shared by all nodes in the group.

Yet another advantage of certain embodiments is that all, or most channels remain synchronised (to clock accuracy) without a user needing to perform any channel-specific configuration beyond assigning a group.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A processor-implemented method of synchronizing rendering of a media channel among a group of receiving devices, wherein each receiving device in the group performs a method comprising:
   receiving a signal from a transmitting device via a media channel, wherein the signal includes a timestamp;
   determining a transmission latency from the transmitting device to the receiving device based on the timestamp;
   obtaining a latency of the transmitting device, wherein the latency of the transmitting device corresponds to an amount of time between when media data is sampled and when the media data receives a timestamp;
   determining a minimum end-to-end latency based on the latency of the transmitting device, the transmission latency, and a latency of the receiving device, wherein the latency of the receiving device corresponds to an amount of time between when media data is written to a receiver buffer and when the media data is rendered;
   determining a maximum end-to-end latency based on the latency of the transmitting device, the latency of the receiving device, and a receiver buffer capacity;
   transmitting a multicast message to other receiving devices in the group, wherein the multicast message includes the minimum end-to-end latency;
   setting a current latency value of the receiving device to the greater of the minimum end-to-end latency of the receiving device or a minimum end-to-end latency of another receiving device in the group; and
   rendering the media channel at the receiving device according to the current latency value, such that the rendering of the media channel by the receiving device is synchronized with the rendering of the media channel by other receiving devices in the group.

2. The method of claim 1 wherein the media channel is an audio channel.

3. The method of claim 1 wherein the media channel is a video channel.

4. The method of claim 1 wherein the media channel transmits compressed audio.

5. The method of claim 1 wherein the multicast message further comprises a group identification number, the maximum end-to-end latency, and the current latency.

6. The method of claim 1 further comprising updating the current latency value if another receiving device in the group transmits a multicast message indicating that the other receiving device has a minimum end-to-end latency greater than the current latency value.

7. The method of claim 1 further comprising determining a latency offset for the receiving device based on the latency of the transmitting device, the latency of the receiving device, and the current latency value, and setting a buffer position in the receiving device based on the latency offset.

8. A non-transitory computer-readable medium storing a program configured to cause a computer to perform the steps comprising:
   receiving a signal from a transmitting device via a media channel, wherein the signal includes a timestamp;
   determining a transmission latency from the transmitting device to the receiving device based on the timestamp;
   obtaining a latency of the transmitting device, wherein the latency of the transmitting device corresponds to an amount of time between when media data is sampled and when the media data receives a timestamp;
   determining a minimum end-to-end latency based on the latency of the transmitting device, the transmission latency, and a latency of the receiving device, wherein the latency of the receiving device corresponds to an amount of time between when media data is written to a receiver buffer and when the media data is rendered;
   determining a maximum end-to-end latency based on the latency of the transmitting device, the latency of the receiving device, and a receiver buffer capacity;
   transmitting a multicast message to other receiving devices in the group, wherein the multicast message includes the minimum end-to-end latency;
   setting a current latency value of the receiving device to the greater of the minimum end-to-end latency of the receiving device or a minimum end-to-end latency of another receiving device in the group; and
   rendering the media channel at the receiving device according to the current latency value, such that the rendering of the media channel by the receiving device is synchronized with the rendering of the media channel by other receiving devices in the group.

9. The computer-readable medium of claim 8 wherein the media channel is an audio channel.

10. The computer-readable medium of claim 8 wherein the media channel is a video channel.

11. The computer-readable medium of claim 8 wherein the media channel transmits compressed audio.

12. The computer-readable medium of claim 8 wherein the multicast message further comprises a group identification number, the maximum end-to-end latency, and the current latency.

13. The computer-readable medium of claim 8 further comprising updating the current latency value if another receiving device in the group transmits a multicast message indicating that the other receiving device has a minimum end-to-end latency greater than the current latency value.

14. The computer-readable medium of claim 8 further comprising determining a latency offset for the receiving device based on the latency of the transmitting device, the latency of the receiving device, and the current latency value, and setting a buffer position in the receiving device based on the latency offset.

15. A system for synchronizing rendering of a media channel among a group of receiving devices, wherein each receiving device in the group comprises:
   a processor; and
   a memory configured to cause the processor to perform steps comprising:
   receiving a signal from a transmitting device via a media channel, wherein the signal includes a timestamp;
   determining a transmission latency from the transmitting device to the receiving device based on the timestamp;
   obtaining a latency of the transmitting device, wherein the latency of the transmitting device corresponds to an amount of time between when media data is sampled and when the media data receives a timestamp;
   determining a minimum end-to-end latency based on the latency of the transmitting device, the transmission latency, and a latency of the receiving device, wherein the latency of the receiving device corresponds to an amount of time between when media data is written to a receiver buffer and when the media data is rendered;
   determining a maximum end-to-end latency based on the latency of the transmitting device, the latency of the receiving device, and a receiver buffer capacity;
   transmitting a multicast message to other receiving devices in the group, wherein the multicast message includes the minimum end-to-end latency;
   setting a current latency value of the receiving device to the greater of the minimum end-to-end latency of the receiving device or a minimum end-to-end latency of another receiving device in the group; and
   rendering the media channel at the receiving device according to the current latency value, such that the rendering of the media channel by the receiving device is synchronized with the rendering of the media channel by other receiving devices in the group.

16. The system of claim 15 wherein the media channel is an audio channel.

17. The system of claim 15 wherein the media channel is a video channel.

18. The system of claim 15 wherein the multicast message further comprises a group identification number, the maximum end-to-end latency, and the current latency.

19. The system of claim 15 further comprising updating the current latency value if another receiving device in the group transmits a multicast message indicating that the other receiving device has a minimum end-to-end latency greater than the current latency value.

20. The system of claim 15 further comprising determining a latency offset for the receiving device based on the latency of the transmitting device, the latency of the receiving device, and the current latency value, and setting a buffer position in the receiving device based on the latency offset.

* * * * *